United States Patent
Bulut et al.

(10) Patent No.: US 11,411,979 B2
(45) Date of Patent: Aug. 9, 2022

(54) COMPLIANCE PROCESS RISK ASSESSMENT

(71) Applicant: International Business Machines Corporation, Armonk, NY (US)

(72) Inventors: Muhammed Fatih Bulut, Ossining, NY (US); Milton H. Hernandez, Tenafly, NJ (US); Jinho Hwang, Ossining, NY (US); Constantin Mircea Adam, Fairfield, CT (US); Daniel S. Riley, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 16/563,504

(22) Filed: Sep. 6, 2019

(65) Prior Publication Data
US 2021/0075814 A1 Mar. 11, 2021

(51) Int. Cl.
*H04L 29/00* (2006.01)
*H04L 9/40* (2022.01)
*G06N 20/00* (2019.01)

(52) U.S. Cl.
CPC ......... *H04L 63/1433* (2013.01); *G06N 20/00* (2019.01); *H04L 63/102* (2013.01); *H04L 63/20* (2013.01)

(58) Field of Classification Search
CPC ..... G06N 20/00; H04L 63/1433; H04L 63/20; H04L 63/102
See application file for complete search history.

(56) References Cited

U.S. PATENT DOCUMENTS

| | | | |
|---|---|---|---|
| 6,895,383 B2 | 5/2005 | Heinrich | |
| 9,411,965 B2 | 8/2016 | Giakouminakis et al. | |
| 10,022,613 B2 | 7/2018 | Tran | |
| 10,230,764 B2 | 3/2019 | Ng et al. | |
| 10,749,890 B1* | 8/2020 | Aloisio | G06N 5/003 |
| 2005/0188040 A1* | 8/2005 | Kott | G06Q 10/107 |
| | | | 709/206 |
| 2009/0024663 A1* | 1/2009 | McGovern | G06F 21/577 |

(Continued)

OTHER PUBLICATIONS

Ognawala, et al., Automatically Assessing Vulnerabilities Discovered by Computational Analysis, Jul. 24, 2018, 10 Pages.

(Continued)

*Primary Examiner* — Don G Zhao
(74) *Attorney, Agent, or Firm* — Amin, Turocy & Watson, LLP

(57) ABSTRACT

Systems, computer-implemented methods, and computer program products that can facilitate compliance process risk assessment are provided. According to an embodiment, a system can comprise a memory that stores computer executable components and a processor that executes the computer executable components stored in the memory. The computer executable components can comprise a metric assignment component that assigns one or more risk assessment metrics based on vulnerability data of a compliance process. The computer executable components can further comprise a risk assignment component that assigns a risk score of the compliance process based on the one or more risk assessment metrics.

25 Claims, 18 Drawing Sheets

(56) References Cited

U.S. PATENT DOCUMENTS

| | | | |
|---|---|---|---|
| 2009/0299896 A1* | 12/2009 | Zhang | G06Q 40/025 705/38 |
| 2009/0319420 A1 | 12/2009 | Sanchez et al. | |
| 2010/0125911 A1* | 5/2010 | Bhaskaran | G06Q 10/10 726/23 |
| 2011/0067005 A1* | 3/2011 | Bassin | G06F 11/008 717/127 |
| 2011/0191138 A1* | 8/2011 | Saraf | G06Q 10/00 705/7.28 |
| 2015/0066575 A1* | 3/2015 | Baikalov | G06Q 10/0635 705/7.28 |
| 2015/0193709 A1* | 7/2015 | Ramesh Babu | G06Q 10/0637 705/7.28 |
| 2016/0321582 A1* | 11/2016 | Broudou | G06N 20/00 |
| 2017/0353482 A1* | 12/2017 | Sommer | H04L 63/20 |
| 2018/0018602 A1* | 1/2018 | DiMaggio | G06N 20/00 |
| 2018/0253661 A1 | 9/2018 | Strauss | |
| 2019/0222597 A1* | 7/2019 | Crabtree | H04L 63/1425 |
| 2019/0312910 A1* | 10/2019 | Convertino | G06F 16/24578 |
| 2019/0343429 A1* | 11/2019 | Elhawary | A61B 5/1126 |
| 2019/0378073 A1* | 12/2019 | Lopez | G06Q 10/06375 |
| 2019/0378216 A1* | 12/2019 | Fiete | G06Q 10/067 |
| 2020/0004938 A1* | 1/2020 | Brannon | G06F 21/316 |
| 2020/0021620 A1* | 1/2020 | Purathepparambil | H04L 63/145 |
| 2020/0050770 A1* | 2/2020 | Inagaki | G06F 16/252 |
| 2020/0052908 A1* | 2/2020 | Thitron | H04L 9/088 |
| 2020/0090088 A1* | 3/2020 | Arora | G06Q 10/0637 |
| 2020/0219372 A1* | 7/2020 | Kwatra | G08B 21/0446 |
| 2020/0273046 A1* | 8/2020 | Biswas | G06Q 30/018 |
| 2020/0285737 A1* | 9/2020 | Kraus | G06F 21/552 |

OTHER PUBLICATIONS

Petraitytel, el al., A Model for Android and iOS Applications Risk Calculation: CVSS Analysis and Enhancement Using Case-Control Studies, Last accessed Jul. 30, 2019, 19 Pages.

Anonymous, Quantifying Risk in Operationalizing ML Models, Jun. 22, 2019, 5 Pages.

Dahir, et al., Dynamic Trust and Risk Scoring Using Last-Known-Profile Learning, Aug. 31, 2016, 13 Pages.

Anonymous, New Systems and Methods for Calculating Risks, Probabilities, Economic Cost, and Resiliency through Scenario Analysis of Impact to a Jurisdiction from Expected and Unexpected Events, Aug. 30, 2015, 6 Pages.

Anonymous, A Continuous Monitoring and Feedback System for Prediction of Patient Readmission Risk, Apr. 23, 2019, 3 Pages.

National Vulnerability Database, https://nvd.nist.gov/vuln/detail/CVE-2018-1977, Last accessed Sep. 4, 2019, 5 Pages.

Mel, et al., The NIST Definition of Cloud Computing, National Institute of Standards and Technology Special Publication 800-145, Sep. 2011, 7 Pages.

* cited by examiner

COMPLIANCE PROCESS RISK ASSESSMENT

BACKGROUND

The subject disclosure relates to compliance process risk assessment, and more specifically, to assigning risk assessment metrics and a risk score to a compliance process based on vulnerability data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate compliance process risk assessment are described.

According to an embodiment, a system can comprise a memory that stores computer executable components and a processor that executes the computer executable components stored in the memory. The computer executable components can comprise a metric assignment component that assigns one or more risk assessment metrics based on vulnerability data of a compliance process. The computer executable components can further comprise a risk assignment component that assigns a risk score of the compliance process based on the one or more risk assessment metrics.

According to another embodiment, a computer-implemented method can comprise assigning, by a system operatively coupled to a processor, one or more risk assessment metrics based on vulnerability data of a compliance process. The computer-implemented method can further comprise assigning, by the system, a risk score of the compliance process based on the one or more risk assessment metrics.

According to another embodiment, a computer program product facilitating compliance process risk assessment is provided. The computer program product comprising a computer readable storage medium having program instructions embodied therewith, the program instructions executable by a processor to cause the processor to assign, by the processor, one or more risk assessment metrics based on vulnerability data of a compliance process. The program instructions are further executable by the processor to cause the processor to assign, by the processor, a risk score of the compliance process based on the one or more risk assessment metrics.

According to an embodiment, a system can comprise a memory that stores computer executable components and a processor that executes the computer executable components stored in the memory. The computer executable components can comprise a risk assignment component that assigns an aggregate risk score of different compliance processes based on risk assessment metrics of different compliance process vulnerability scoring systems. The computer executable components can further comprise a manager component that assigns a level of priority to management of one or more assets of the different compliance processes based on the aggregate risk score.

According to another embodiment, a computer-implemented method can comprise assigning, by a system operatively coupled to a processor, an aggregate risk score of different compliance processes based on risk assessment metrics of different compliance process vulnerability scoring systems. The computer-implemented method can further comprise assigning, by the system, a level of priority to management of one or more assets of the different compliance processes based on the aggregate risk score.

DETAILED DESCRIPTION

Figure 1:
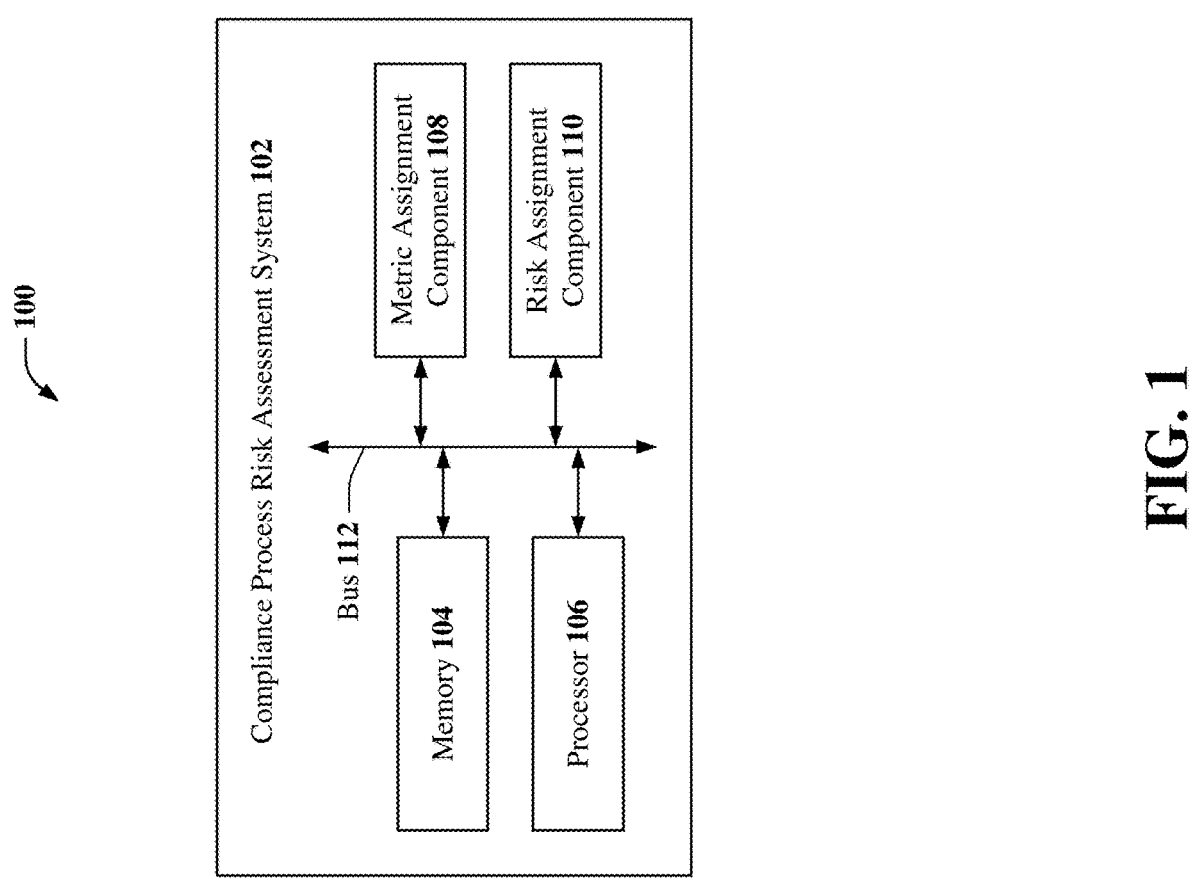
FIG. 1 illustrates a block diagram of an example, non-limiting system that can facilitate compliance process risk assessment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Currently, the scope of risk assessment covers only operational environment, not the entire development and operational cycles. Assigning scores to vulnerabilities (also referred to as security defects) helps security specialist to be able to reason about the risk that the vulnerabilities pose. Assigning scores to vulnerabilities requires expertise and thinking (e.g., by a subject matter expert (SME)) from the perspective of practical or hypothetical exploitation. Different security processes have different methodologies and/or controls that enable assignment of a risk score. For example, the Common Vulnerability Scoring System (CVSS) provides a way of assigning scores to vulnerabilities. However, a problem with existing compliance process risk assessment systems is that it takes time (e.g., 5-10 minutes or more) for analysts to understand and assign scores (e.g., based on CVSS) to vulnerabilities, and such time may vary based on the expertise level. Another problem with existing compliance process risk assessment systems is that they do not provide a compliance process risk assessment standard (e.g., methodology) that can be implemented across various security processes (also referred to as compliance processes). Another problem with existing compliance process risk assessment systems is that they do not provide such a compliance process risk assessment standard (e.g., methodology) that can be implemented to aggregate within and/or across different security processes.

Given the above problem with current compliance process risk assessment systems not providing such a compliance process risk assessment standard (e.g., methodology) described above, the present disclosure can be implemented to produce a solution to this problem in the form of systems, computer-implemented methods, and/or computer program products that can: a) set a vulnerability scoring system (e.g., CVSS) as a methodology; b) collect vulnerabilities and corresponding assigned scores from different data sources (e.g. forums, threat websites, National Vulnerability Database (NVD), social media, etc.); c) use such previous history of vulnerabilities to build a machine learning (ML) model that can: $c_1$) build a word embedding model that can output a vector representation for each given word (e.g., via word2vec, glove, BERT, etc.); $c_2$) capture different dimensions (also referred to as metrics) of the scoring system; and $c_3$) predict a vulnerability score for a given description of a defect (e.g., vulnerability); and/or d) given a description of a defect or vulnerability; $d_1$) assign different dimensions (metrics) of the scoring system (e.g., CVSS); $d_2$) assign a risk score using the model; $d_3$) prioritize assets based on the risk they pose; and/or $d_4$) employ a feedback mechanism to improve and/or retrain the model.

FIG. 1 illustrates a block diagram of an example, non-limiting system 100 that can facilitate compliance process risk assessment in accordance with one or more embodiments described herein. In some embodiments, system 100 can comprise a compliance process risk assessment system 102, which can be associated with a cloud computing environment. For example, compliance process risk assessment system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

In some embodiments, compliance process risk assessment system 102 and/or components thereof (e.g., metric assignment component 108, risk assignment component 110, collection component 202, trainer component 204, update component 206, manager component 208, etc.) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.) and/or one or more quantum computing devices (e.g., quantum computer, quantum processor, quantum circuit simulation software, superconducting circuit, etc.) that can be employed by compliance process risk assessment system 102 and/or components thereof to execute one or more operations in accordance with one or more embodiments of the subject disclosure described herein. For instance, compliance process risk assessment system 102 and/or components thereof can employ such one or more classical and/or quantum computing devices to execute one or more mathematical functions and/or equations, one or more computing and/or processing scripts, one or more models (e.g., artificial intelligence (AI) models, machine learning (ML) models, etc.), one or more classical and/or quantum algorithms, and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. According to several embodiments, compliance process risk assessment system 102 can comprise a memory 104, a processor 106, a metric assignment component 108, a risk assignment component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or compliance process risk assessment system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to compliance process risk assessment system 102, metric assignment component 108, risk assignment component 110, and/or another component associated with compliance process risk assessment system 102 (e.g., collection component 202, trainer component 204, update component 206, manager component 208, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Compliance process risk assessment system 102, memory 104, processor 106, metric assignment component 108, risk assignment component 110, and/or another component of compliance process risk assessment system 102 as described herein can be communicatively, electrically, and/or operatively coupled to one another via a bus 112 to perform functions of system 100, compliance process risk assessment system 102, and/or any components coupled therewith. In several embodiments, bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Compliance process risk assessment system 102 can comprise any type of component, machine, device, facility, apparatus, and/or instrument that comprises a processor and/or can be capable of effective and/or operative communication with a wired and/or wireless network. All such embodiments are envisioned. For example, compliance process risk assessment system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Compliance process risk assessment system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, compliance process risk assessment system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, compliance process risk assessment system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, compliance process risk assessment system 102 can thus include hardware (e.g., a central processing unit (CPU), a transceiver, a decoder, a quantum processor, etc.), software (e.g., a set of threads, a set of processes, software in execution, quantum pulse schedule, quantum circuit, etc.) or a combination of hardware and software that facilitates communicating information between compliance process risk assessment system 102 and external systems, sources, and/or devices (e.g., computing devices, communication devices, etc.).

Compliance process risk assessment system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with compliance process risk assessment system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, metric assignment component 108, risk assignment component 110, and/or any other components associated with compliance process risk assessment system 102 as disclosed herein (e.g., communicatively, electronically, operatively, and/or optically coupled with and/or employed by compliance process risk assessment system 102), can comprise such computer and/or machine readable, writable, and/or executable component(s) and/or instruction(s). Consequently, according to numerous embodiments, compliance process risk assessment system 102 and/or any components associated therewith as disclosed herein, can employ processor 106 to execute such computer and/or machine readable, writable, and/or executable component(s) and/or instruction(s) to facilitate performance of one or more operations described herein with reference to compliance process risk assessment system 102 and/or any such components associated therewith.

Compliance process risk assessment system 102 can facilitate performance of operations executed by and/or associated with metric assignment component 108, risk assignment component 110, and/or another component associated with compliance process risk assessment system 102 as disclosed herein (e.g., collection component 202, trainer component 204, update component 206, manager component 208, etc.). For example, as described in detail below, compliance process risk assessment system 102 can facilitate via processor 106 (e.g., a classical processor, a quantum processor, etc.): assigning one or more risk assessment metrics based on vulnerability data of a compliance process; and/or assigning a risk score of the compliance process based on the one or more risk assessment metrics. In some embodiments, compliance process risk assessment system 102 can further facilitate via processor 106 (e.g., a classical processor, a quantum processor, etc.): collecting historical vulnerability data comprising at least one of vulnerability descriptions, vulnerability categories, or vulnerability scores corresponding to vulnerabilities of the compliance process; training a model to assign at least one of the one or more risk assessment metrics or the risk score based on at least one of historical vulnerability data, expert feedback, operational data feedback, or transfer learning data; adjusting the risk score based on feedback data corresponding to the risk score; adding at least one of the vulnerability data or the risk score to a vulnerability database; and/or assigning a level of priority to management of an asset of the compliance process based on the risk score, thereby facilitating at least one of reduced impact to or exploitation of vulnerabilities of the asset.

Compliance process risk assessment system 102 can further facilitate via processor 106 (e.g., a classical processor, a quantum processor, etc.): assigning an aggregate risk score of different compliance processes based on risk assessment metrics of different compliance process vulnerability scoring systems; and/or assigning a level of priority to management of one or more assets of the different compliance processes based on the aggregate risk score. In some embodiments, compliance process risk assessment system 102 can further facilitate via processor 106 (e.g., a classical processor, a quantum processor, etc.): assigning the risk assessment metrics based on vulnerability data of the different compliance processes; and/or training a model to assign at least one of the risk assessment metrics or the aggregate risk score based on at least one of historical vulnerability data, expert feedback, operational data feedback, or transfer learning data.

Metric assignment component 108 can assign one or more risk assessment metrics based on vulnerability data of a compliance process. In some embodiments, metric assignment component 108 can employ a model to assign one or more risk assessment metrics based on vulnerability data of a compliance process. For example, metric assignment component 108 can employ a machine learning (ML) model based on Artificial Intelligence (AI) and Natural Language Processing (NLP), including, but not limited to, a shallow or deep neural network model, a long short-term memory (LSTM) model, a gated recurrent unit (GRU) model, a convolutional neural network (CNN) model, a support vector machine (SVM) model, a decision tree classifier, or any supervised or unsupervised machine learning model.

Metric assignment component 108 can employ such a model defined above that has been trained to assign one or more risk assessment metrics based on vulnerability data of a compliance process. For example, metric assignment component 108 can employ such a model defined above that has been trained by, for instance, trainer component 204 as described below with reference to FIG. 2. For instance, metric assignment component 108 can employ a deep neural network model (e.g., an LSTM model, a GRU model, a CNN model, etc.) that has been trained by trainer component 204 (e.g., as described below with reference to FIG. 2) to assign one or more risk assessment metrics based on vulnerability data of a compliance process.

Metric assignment component 108 can employ such a model defined above (e.g., LSTM, GRU, CNN, etc.) to assign one or more risk assessment metrics based on vulnerability data of a compliance process, where such one or more risk assessment metrics can comprise exploitability metrics, impact metrics, and/or another risk assessment metric of a compliance process vulnerability scoring system. For example, such one or more risk assessment metrics can comprise exploitability metrics and/or impact metrics including, but not limited to, attack vector (AV), access complexity (AC), authentication (Au), confidentiality impact (C), integrity impact (I), availability impact (A), and/or another exploitability metric and/or impact metric of a compliance process vulnerability scoring system such as, for instance, the Common Vulnerability Scoring System (CVSS) and/or another compliance process vulnerability scoring system.

In some embodiments, such one or more risk assessment metrics can comprise designators that can indicate a level of affect a risk assessment metric can have with respect to a certain compliance process. For example, given exploitability metrics comprising attack vector (AV), access complexity (AC), and/or authentication (Au):attack vector (AV) can have designators such as, local (AV:L), adjacent network (AV:A), and/or network (AV:N); access complexity (AC) can have designators such as, high (AC:H), medium (AC:M), and/or low (AC:L); and/or authentication (Au) can have designators such as, multiple (Au:M), single (Au:S), and/or none (Au:N). In another example, given impact metrics comprising confidentiality impact (C), integrity impact (I), and/or availability impact (A): confidentiality impact (C) can have designators such as, none (C:N), partial (C:P), and/or complete (C:C); integrity impact (I) can have designators such as, none (I:N), partial (I:P), and/or complete (I:C); and/or availability impact (A) can have designators such as, none (A:N), partial (A:P), and/or complete (A:C), for instance, as indicated in CVSS version 2.

In some embodiments, such designators defined above can have certain numerical values assigned thereto that can quantify the level of affect the corresponding risk assessment metric can have with respect to a certain compliance process. For instance, such numerical values can range from 0 to 10, where a numerical value of 0 can denote the lowest level of affect and a numerical value of 10 can denote the highest level of affect. In some embodiments, such designators and/or corresponding numerical values can be utilized by, for instance, risk assignment component 110 to assign a risk score and/or an aggregate risk score to one or more (e.g., different) compliance processes.

Metric assignment component 108 can employ such a model defined above (e.g., LSTM, GRU, CNN, etc.) to assign one or more of such risk assessment metrics defined above based on vulnerability data of a compliance process, where such a compliance process can include, but is not limited to: a security process; a patching process; an identity and access management process; a development and operations (DevOps) process; a development, security, and operations (DevSecOps) process; a runtime process; and/or another compliance process. In some embodiments, examples of such vulnerability data of such a compliance process can include, but are not limited to, vulnerability descriptions, vulnerability categories, and/or vulnerability scores corresponding to vulnerabilities (e.g., defects) of the compliance process.

In some embodiments, metric assignment component 108 can assign risk assessment metrics of different compliance process vulnerability scoring systems based on vulnerability data (e.g., vulnerability descriptions, vulnerability categories, vulnerability scores, etc.) of different compliance processes (e.g., security process, patching process, identity and access management process, DevOps process, DevSecOps process, runtime process, etc.). For example, metric assignment component 108 can employ such a model defined above (e.g., LSTM, GRU, CNN, etc.) to assign risk assessment metrics (e.g., the risk assessment metrics defined above) from the CVSS and another compliance process vulnerability scoring system based on vulnerability data of different compliance processes.

To facilitate assignment of one or more risk assessment metrics of one or more (e.g., different) compliance process vulnerability scoring systems based on such vulnerability data defined above of one or more (e.g., different) compliance processes, metric assignment component 108 can employ a model defined above that can utilize a natural language extraction process and/or an embedding technique (e.g., word and/or text embedding technique) to output a vector representation for each given word and/or text character (e.g., numbers) in such vulnerability data corresponding to one or more compliance processes. Based on such vector representation of each word and/or text character, such a model can determine the risk assessment metrics of one or more compliance process vulnerability scoring systems that can be employed (e.g., via risk assignment component 110) to determine a risk score (e.g., an aggregate risk score) of one or more compliance processes.

In an example, metric assignment component 108 can employ model 300a described below with reference to FIG. 3A to assign one or more risk assessment metrics of one or more (e.g., different) compliance process vulnerability scoring systems based on such vulnerability data defined above of one or more (e.g., different) compliance processes. In another example, metric assignment component 108 can employ model 300b described below with reference to FIG. 3B to assign one or more risk assessment metrics of one or more (e.g., different) compliance process vulnerability scoring systems based on such vulnerability data defined above of one or more (e.g., different) compliance processes. In this example, metric assignment component 108 can employ model 300b to assign such one or more risk assessment metrics based on transfer learning, where model 300b can learn to assign risk assessment metrics from a certain compliance process vulnerability scoring system using information it has learned previously in assigning risk assessment metrics from other compliance process vulnerability scoring systems. In another example, metric assignment component 108 can employ deep learning model 412 described below with reference to FIG. 4C to assign one or more risk assessment metrics of one or more (e.g., different) compliance process vulnerability scoring systems based on such vulnerability data defined above of one or more (e.g., different) compliance processes.

Risk assignment component 110 can assign a risk score of a compliance process based on one or more risk assessment metrics. For example, risk assignment component 110 can assign a risk score of a compliance process based on one or more risk assessment metrics that can be assigned by metric assignment component 108 as described above. For instance, risk assignment component 110 can assign a risk score of a compliance process based on one or more designators and/or numerical value(s) assigned thereto that correspond to such one or more risk assessment metrics that can be assigned by metric assignment component 108 as described above.

Risk assignment component 110 can assign a risk score to a compliance process based on one or more risk assessment metrics, designators, and/or corresponding numerical values of a compliance process vulnerability scoring system that can be assigned by metric assignment component 108 based on vulnerability data corresponding to the compliance process. In some embodiments, risk assignment component 110 can assign an aggregate risk score to a collection of different compliance processes based on different risk assessment metrics, designators, and/or corresponding numerical values of different compliance process vulnerability scoring systems that can be assigned by metric assignment component 108 based on vulnerability data corresponding to the different compliance processes.

In an example, risk assignment component 110 can assign such a risk score based on an average or a weighted average of such numerical values assigned to such designators. In another example, risk assignment component 110 can assign an aggregate risk score to a collection of different compliance processes based on an average or a weighted average of numerical values assigned to designators of different risk assessment metrics of different compliance process vulnerability scoring systems.

Risk assignment component 110 can assign a risk score comprising a base score of a compliance process that can be determined based on one or more risk assessment metrics of a compliance process vulnerability scoring system that can be assigned by metric assignment component 108 based on vulnerability data corresponding to the compliance process. In another example, risk assignment component 110 can assign one or more risk scores comprising environmental risk score(s) and/or modified impact risk score(s) corresponding to one or more risk assessment metrics of a compliance process, where such scores can be assigned based on modifiers that can affect the risk score. Examples of such modifiers can include general modifiers (e.g., collateral damage potential (CDP), target distribution (TD), etc.), impact subscore modifiers (e.g., confidentiality requirement (CR), integrity requirement (IR), availability requirement (AR), etc.), and/or another modifier, for instance, as specified by CVSS version 2.

In some embodiments, risk assignment component 110 can use a bar chart to depict one or more risk scores assigned by risk assignment component 110. For example, risk assignment component 110 can use bar chart 406 and/or bar chart 410 illustrated in FIGS. 4A and 4B, respectively. In some embodiments, risk assignment component 110 can use a spider diagram and/or a single score (e.g., numerical value) to depict a risk score assigned by risk assignment component 110. For example, risk assignment component 110 can use spider diagram 414 and/or risk score 416, respectively, as illustrated in FIG. 4C.

In an example, risk assignment component 110 can assign a risk score comprising a numerical value ranging from 0 to 10, where a numerical value of 0 can denote the lowest risk and a numerical value of 10 can denote the highest risk. In another example, risk assignment component 110 can assign a risk score comprising a numerical value ranging from 0.0 to 3.9 that can denote low severity. In another example, risk assignment component 110 can assign a risk score comprising a numerical value ranging from 4.0 to 6.9 that can denote medium severity. In another example, risk assignment component 110 can assign a risk score comprising a numerical value ranging from 7.0 to 10.0 that can denote high severity, for instance, as indicated in CVSS version 2.

Risk assignment component 110 can adjust a risk score and/or aggregate risk score defined above based on feedback data corresponding to such a risk score and/or aggregate risk score. For example, risk assignment component 110 can adjust a risk score based on feedback data corresponding to the risk score and/or aggregate risk score, where such feedback data can comprise expert feedback data from expert entity 506. For instance, such expert feedback data from expert entity 506 can comprise validation or invalidation of a risk score and/or an aggregate risk score.

Figure 2:
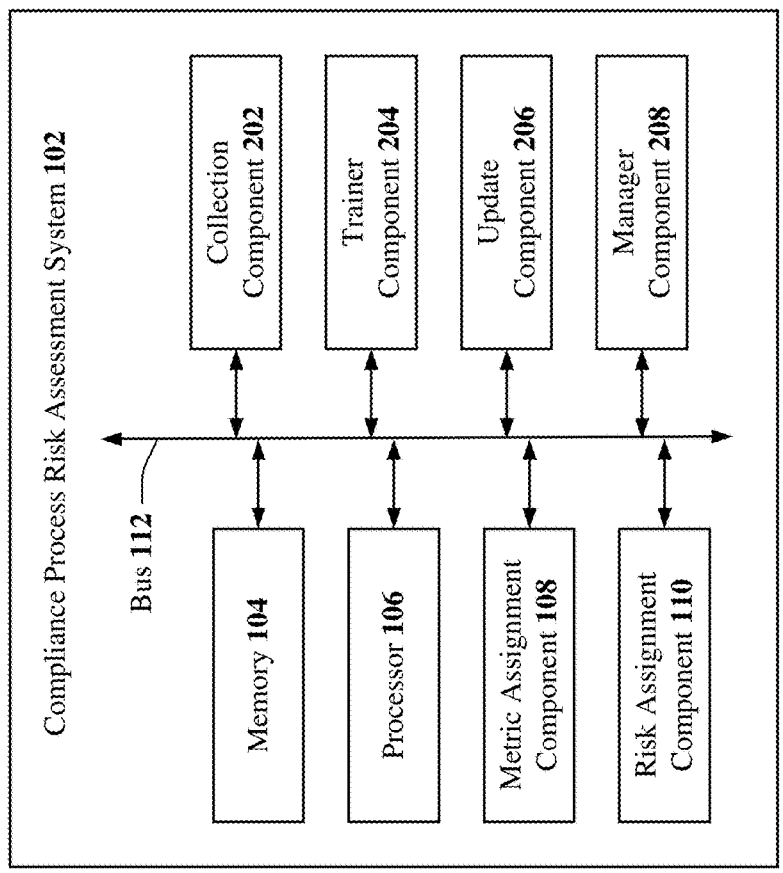
FIG. 2 illustrates a block diagram of an example, non-limiting system that can facilitate compliance process risk assessment in accordance with one or more embodiments described herein.

FIG. 2 illustrates a block diagram of an example, non-limiting system 200 that can facilitate compliance process risk assessment in accordance with one or more embodiments described herein. In some embodiments, system 200 can comprise compliance process risk assessment system 102. In some embodiments, compliance process risk assessment system 102 can comprise a collection component 202, a trainer component 204, an update component 206, and/or a manager component 208. Repetitive description of like elements and/or processes employed in respective embodiments is omitted for sake of brevity.

Collection component 202 can collect historical vulnerability data comprising vulnerability descriptions, vulnerability categories, vulnerability scores and/or other vulnerability data corresponding to vulnerabilities (e.g., defects) of one or more compliance processes. Such vulnerability scores can correspond to such vulnerabilities. In some embodiments, collection component 202 can collect such historical vulnerability data defined above from one or more data sources including, but not limited to, website forums, threat websites, a vulnerability database, the National Vulnerability Database (NVD), social media, enterprise resources, and/or another data source. To facilitate collection of such historical vulnerability data, collection component 202 can employ a model defined above with reference to FIG. 1 and/or a natural language extraction process including, but not limited to, natural language processing (NLP), named entity recognition (NER), natural language annotation, and/or another natural language extraction process that can extract such historical vulnerability data (e.g., textual data) from such data sources defined above.

In an example, collection component 202 can employ such a model and/or natural language extraction process defined above to collect historical vulnerability data from vulnerability database 502 described below with reference to FIG. 5A In this example, vulnerability database 502 can comprise historical vulnerability data including, but not limited to, vulnerabilities received from one or more computing resources 504 (e.g., operational data received from one or more cloud computing nodes 910 of cloud computing environment 950), expert feedback received from expert entity 506, and/or other historical vulnerability data.

Trainer component 204 can train a model to assign one or more risk assessment metrics and/or one or more risk scores based on historical vulnerability data, expert feedback, operational data feedback, and/or transfer learning data. For example, trainer component 204 can train a model defined above with reference to FIG. 1 to assign one or more risk assessment metrics and/or one or more risk scores based on historical vulnerability data (e.g., collected via collection component 202), expert feedback (e.g., from expert entity 506), operational data feedback (e.g., from computing resources 504), and/or transfer learning data (e.g., via model 300b). In an example, trainer component 204 can train model 300a, model 300b, and/or deep learning model 412 described below with reference to FIGS. 3A, 3B, and 4C, respectively, to assign one or more risk assessment metrics (e.g., via metric assignment component 108) and/or one or more risk scores (e.g., via risk assignment component 110) based on such historical vulnerability data, expert feedback, operational data feedback, and/or transfer learning data.

To facilitate training a model to assign one or more risk assessment metrics and/or one or more risk scores based on such historical vulnerability data defined above with reference to FIG. 1 that can be collected via collection component 202, trainer component 204 can employ algorithm (1) defined below:

Algorithm (1)
Input: Previously submitted vulnerability descriptions $D_i$ and their associated score $S_i$.
  for each $(D_j, S_j)$ tuple
  Calculate word vector $(w_j)$ for $D_j$ using embedding trained out of all vulnerabilities or use a pre-trained embedding available publicly, based on which performs better.
  Store $w_j$ as a feature vector in list X;
  Store $S_j$ in Y.
  Train Deep Neural Network model using X as input Y as output for Scoring.

In some embodiments, trainer component 204 can train such a model to assign one or more risk assessment metrics and/or one or more risk scores based on expert feedback (e.g., from expert entity 506) and/or operational data feedback (e.g., from computing resources 504). In these embodiments, such training can constitute active learning based classification. To implement such active learning, trainer component 204 can employ algorithm (2) defined below with reference to FIG. 5B.

In another example, trainer component 204 can train a model such as, for instance, model 300b described below with reference to FIG. 3B to assign one or more risk assessment metrics and/or one or more risk scores based on transfer learning. For instance, trainer component 204 can train model 300b to assign one or more risk assessment metrics and/or one or more risk scores corresponding to compliance process vulnerability scoring systems, vulnerability data, and/or one or more compliance processes it has learned previously in assigning other risk assessment metrics and/or risk assessment scores.

In some embodiments, trainer component 204 can train a model defined above to learn to assign one or more risk assessment metrics and/or one or more risk scores based on such training data defined above (e.g., historical vulnerability data, expert feedback, operational data feedback, and/or transfer learning data), where such learning can be implemented using supervised learning and/or unsupervised learning. For instance, trainer component 204 can train a model defined above to learn to assign such one or more risk assessment metrics and/or one or more risk scores based on supervised learning (e.g., reinforcement learning, etc.) using previously obtained historical vulnerability data defined above. In another example, trainer component 204 can train a model defined above to learn to assign such one or more risk assessment metrics and/or one or more risk scores based on unsupervised learning using expert entity feedback (e.g., from expert entity 506), operation data feedback (e.g., vulnerabilities received from computing resources 504), and/or transfer learning data.

Trainer component 204 can train a model defined above to learn to assign such one or more risk assessment metrics and/or one or more risk scores based on classifications, correlations, inferences and/or expressions associated with principles of artificial intelligence. For instance, trainer component 204 can train a model defined above to learn to assign such one or more risk assessment metrics and/or one or more risk scores based on previously obtained historical vulnerability data defined above (e.g., vulnerability descriptions, vulnerability categories, vulnerability scores, etc.), expert feedback, operational data feedback, and/or transfer learning data by employing a probabilistic and/or statistical-based analysis (e.g., factoring into the analysis utilities and costs).

Trainer component 204 can employ any suitable machine learning based techniques, statistical-based techniques, and/or probabilistic-based techniques to train a model defined above to learn to assign such one or more risk assessment metrics and/or one or more risk scores based on historical vulnerability data defined above (e.g., vulnerability descriptions, vulnerability categories, vulnerability scores, etc.), expert feedback, operational data feedback, and/or transfer learning data. For example, trainer component 204 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, trainer component 204 can perform a set of machine learning computations associated with training a model defined above to train a model defined above to learn to assign such one or more risk assessment metrics and/or one or more risk scores based on historical vulnerability data defined above (e.g., vulnerability descriptions, vulnerability categories, vulnerability scores, etc.), expert feedback, operational data feedback, and/or transfer learning data. For example, trainer component 204 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to train a model defined above to learn to assign such one or more risk assessment metrics and/or one or more risk scores based on historical vulnerability data defined above (e.g., vulnerability descriptions, vulnerability categories, vulnerability scores, etc.), expert feedback, operational data feedback, and/or transfer learning data.

Update component 206 can add vulnerability data and/or one or more risk scores (e.g., a risk score, an aggregate risk score, etc.) to a vulnerability database. For example, update component 206 can add (e.g., store, save) vulnerability data and/or one or more risk scores to a vulnerability database such as, for instance, vulnerability database 502 described below with reference to FIG. 5A.

In an example, update component 206 can add (e.g., store, save) to a vulnerability database any newly discovered vulnerability data (e.g., vulnerability descriptions, vulnerability categories, vulnerability scores, etc.) provided by computing resources 504 as described below with reference to FIG. 5A. In another example, update component 206 can add to a vulnerability database the historical vulnerability data defined above with reference to FIG. 1 (e.g., vulnerability descriptions, vulnerability categories, vulnerability scores, etc.) that can be collected by collection component 202.

In some embodiments, update component 206 can add (e.g., store, save) to a vulnerability database vulnerability data and/or one or more risk scores that have been verified for accuracy (e.g., validated or invalidated) by an expert entity such as, for instance, expert entity 506 as described below with reference to FIG. 5A. For example, risk assignment component 110 can assign a risk score and/or an aggregate risk score to a compliance process based on one or more risk assessment metrics that can be assigned by metric assignment component 108 based on vulnerability data as described above with reference to FIG. 1. In this example, compliance process risk assessment system 102, metric assignment component 108, and/or risk assignment component 110 can provide such vulnerability data and/or one or more risk scores to expert entity 506 as described below with reference to FIG. 5A. In this example, expert entity 506 can verify (e.g., validate or invalidate) such vulnerability data and/or risk score(s) for accuracy. In this example, based on such verification (e.g., validation or invalidation), update component 206 can save such vulnerability data and/or risk scores on a vulnerability database (e.g., vulnerability database 502).

Manager component 208 can assign a level of priority to management of an asset of a compliance process based on a risk score. For example, manager component 208 can assign a level of priority to management of an asset associated with (e.g., subject to, affected by, etc.) execution of a compliance process based on a risk score corresponding to the compliance process that can be assigned by risk assignment component 110 as described above with reference to FIG. 1. In some embodiments, manager component 208 can assign a level of priority to management of one or more assets associated with (e.g., subject to, affected by, etc.) execution of a collection of different compliance processes based on an aggregate risk score corresponding to the collection of different compliance processes.

In an example, where such a risk score and/or aggregate risk score indicates that certain assets have higher risk to vulnerabilities relative to other assets, manager component 208 can execute one or more compliance processes affecting such higher risk assets before executing such compliance process(es) affecting lower risk assets. In another example, where such a risk score and/or aggregate risk score indicates that certain assets have lower risk to vulnerabilities relative to other assets, manager component 208 can execute one or more compliance processes affecting such lower risk assets before executing such compliance process(es) affecting higher risk assets.

Figure 3A:
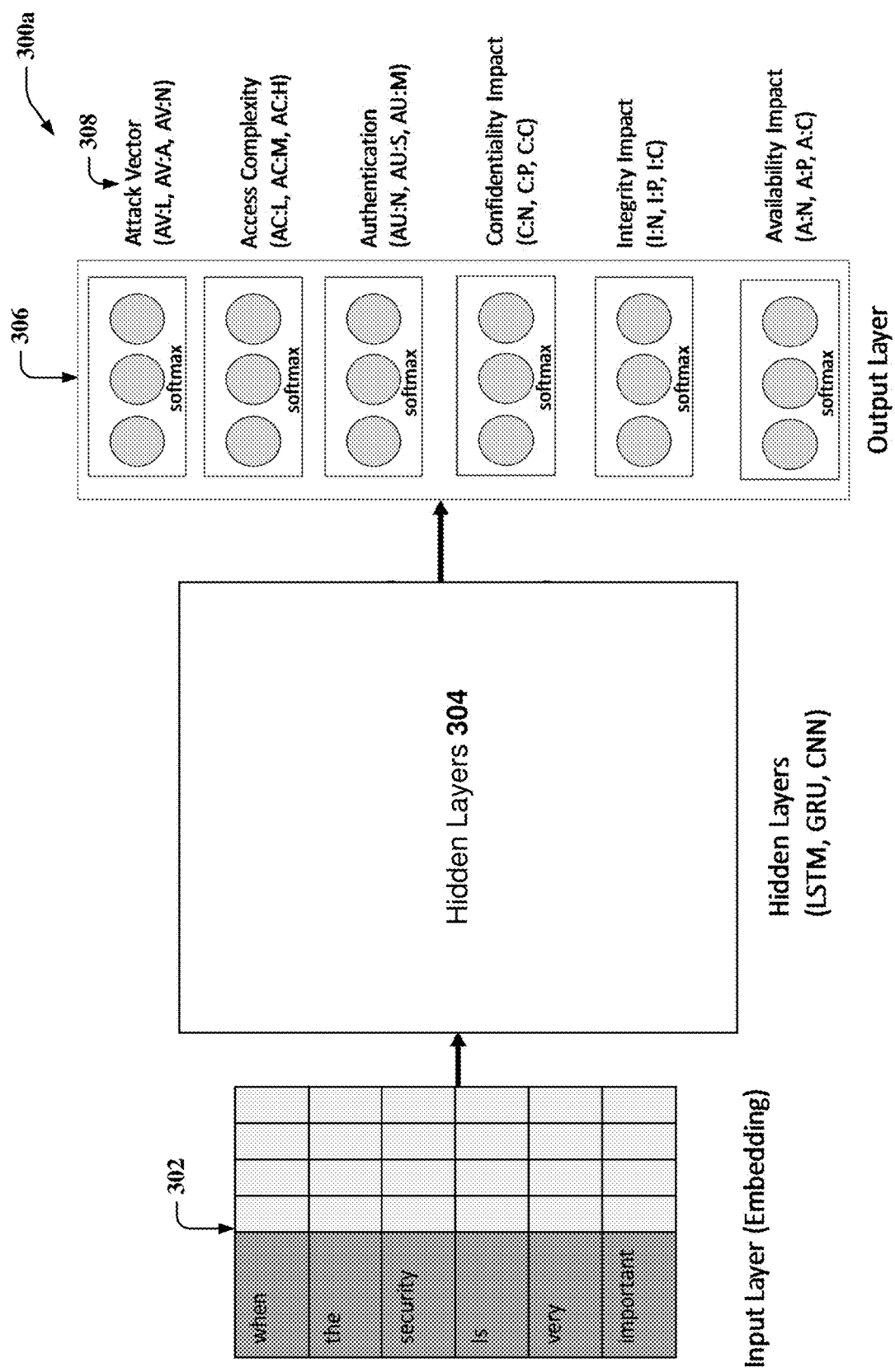
FIG. 3A illustrates a block diagram of an example, non-limiting model that can facilitate compliance process risk assessment in accordance with one or more embodiments described herein.

FIG. 3A illustrates a block diagram of an example, non-limiting model 300a that can facilitate compliance process risk assessment in accordance with one or more embodiments described herein. Repetitive description of like elements and/or processes employed in respective embodiments is omitted for sake of brevity.

Model 300a can comprise an input layer 302 that can perform word and/or text embedding of one or more words and/or text characters in textual data. For example, input layer 302 that can perform word and/or text embedding of one or more words and/or text characters in textual data comprising vulnerability data (e.g., vulnerability descriptions, vulnerability categories, vulnerability scores, etc.). Such an embedding can either be trained from the vulnerability and other kind of data (e.g., data from the Internet) or used from already pre-trained ones that are publicly available (e.g., there currently exists pre-trained embedding in public that use data from the Internet, for instance, and other sources).

Model 300a can further comprise one or more hidden layers 304. Hidden layers 304 can comprise, for instance, a long short-term memory (LSTM) layer, a gated recurrent unit (GRU) layer, a convolutional neural network (CNN) layer, and/or another hidden layer. In an example, based on vulnerability data of a compliance process input to input layer 302, hidden layers 304 can assign risk assessment metric(s) of a compliance process vulnerability scoring system that can be utilized to assign a risk score to the compliance process. In another example, based on vulnerability data of a collection of different compliance processes that can be input to input layer 302, hidden layers 304 can assign risk assessment metrics of different compliance process vulnerability scoring systems that can be utilized to assign an aggregate risk score to the collection of different compliance process.

Model 300a can further comprise an output layer 306 that can output one or more risk assessment metrics 308 that can be assigned by hidden layers 304 as described above. For example, output layer 306 can output risk assessment metrics 308 comprising exploitability metrics and/or impact metrics including, but not limited to attack vector (AV:L, AV:A, AV:N), access complexity (AC:L, AC:M, AC:H), authentication (AU:N, AU:S, AU:M), confidentiality impact (C:N, C:P, C:C), integrity impact (I:N, I:P, I:C), availability impact (A:N, A:P, A:C) as illustrated in FIG. 3A, and/or another exploitability metric and/or impact metric of one or more compliance process vulnerability scoring systems.

Figure 3B:
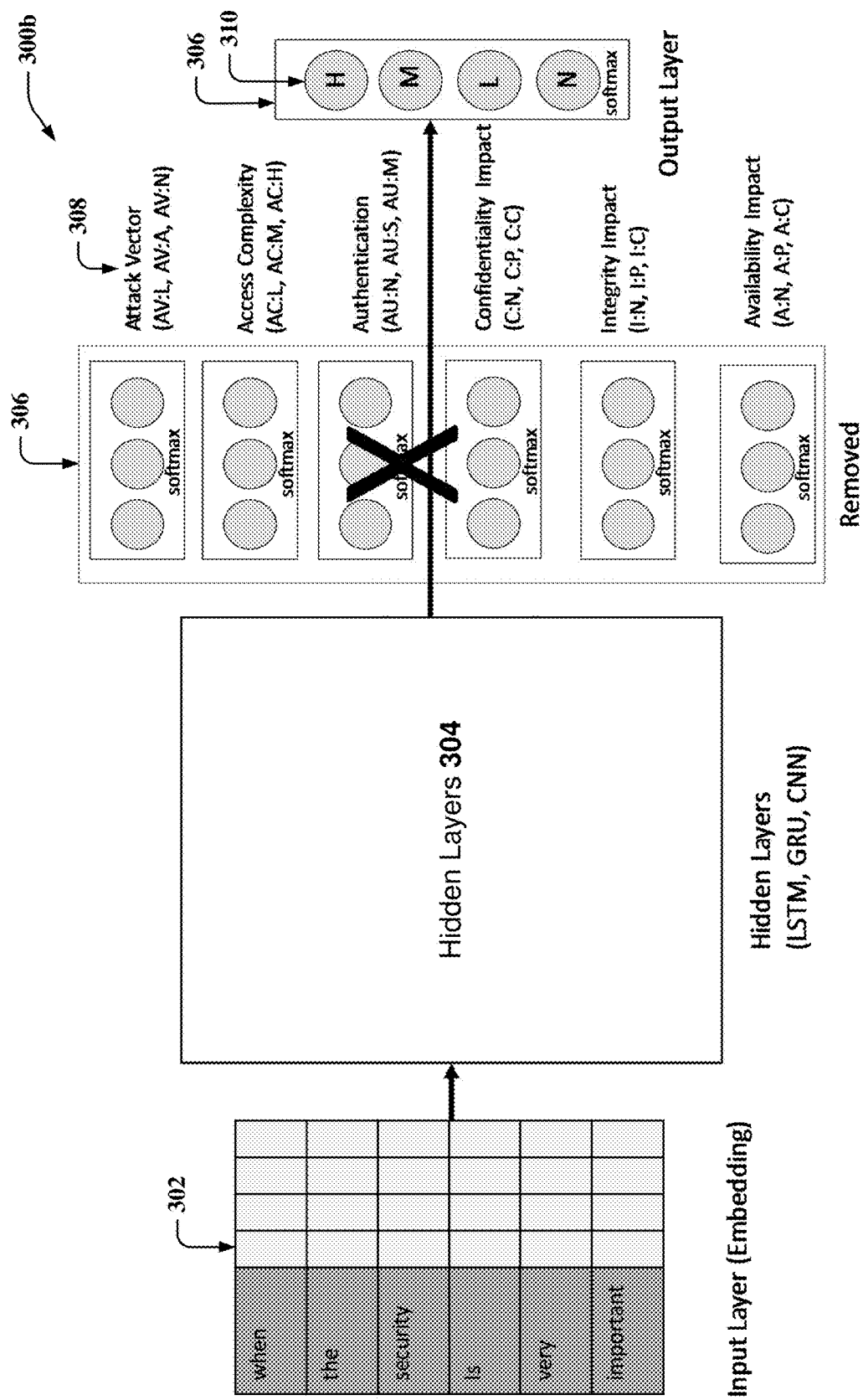
FIG. 3B illustrates a block diagram of an example, non-limiting model that can facilitate compliance process risk assessment in accordance with one or more embodiments described herein.

FIG. 3B illustrates a block diagram of an example, non-limiting model 300b that can facilitate compliance process risk assessment in accordance with one or more embodiments described herein. Repetitive description of like elements and/or processes employed in respective embodiments is omitted for sake of brevity.

Model 300b can comprise an example non-limiting alternative embodiment of model 300a, where model 300b can perform transfer learning on different types of texts. For example, hidden layers 304 of model 300b can learn to assign risk assessment metric(s) from a certain compliance process vulnerability scoring system using information hidden layers 304 has learned previously in assigning risk assessment metrics from other compliance process vulnerability scoring systems. In this example, such previously learned information (e.g. model parameters) can comprise one or more risk assessment metrics and/or one or more risk scores corresponding to one or more compliance process vulnerability scoring systems, vulnerability data, and/or one or more compliance processes hidden layers 304 has learned previously in assigning other risk assessment metrics.

In an embodiment, based on such transfer learning described above, output layer 306 can output one or more risk assessment metrics 310 instead of risk assessment metrics 308. In an example, risk assessment metrics 310 can comprise risk assessment metrics including, but not limited to, high (H), medium (M), low (L), and/or none (N) as illustrated in FIG. 3B.

Figure 4A:
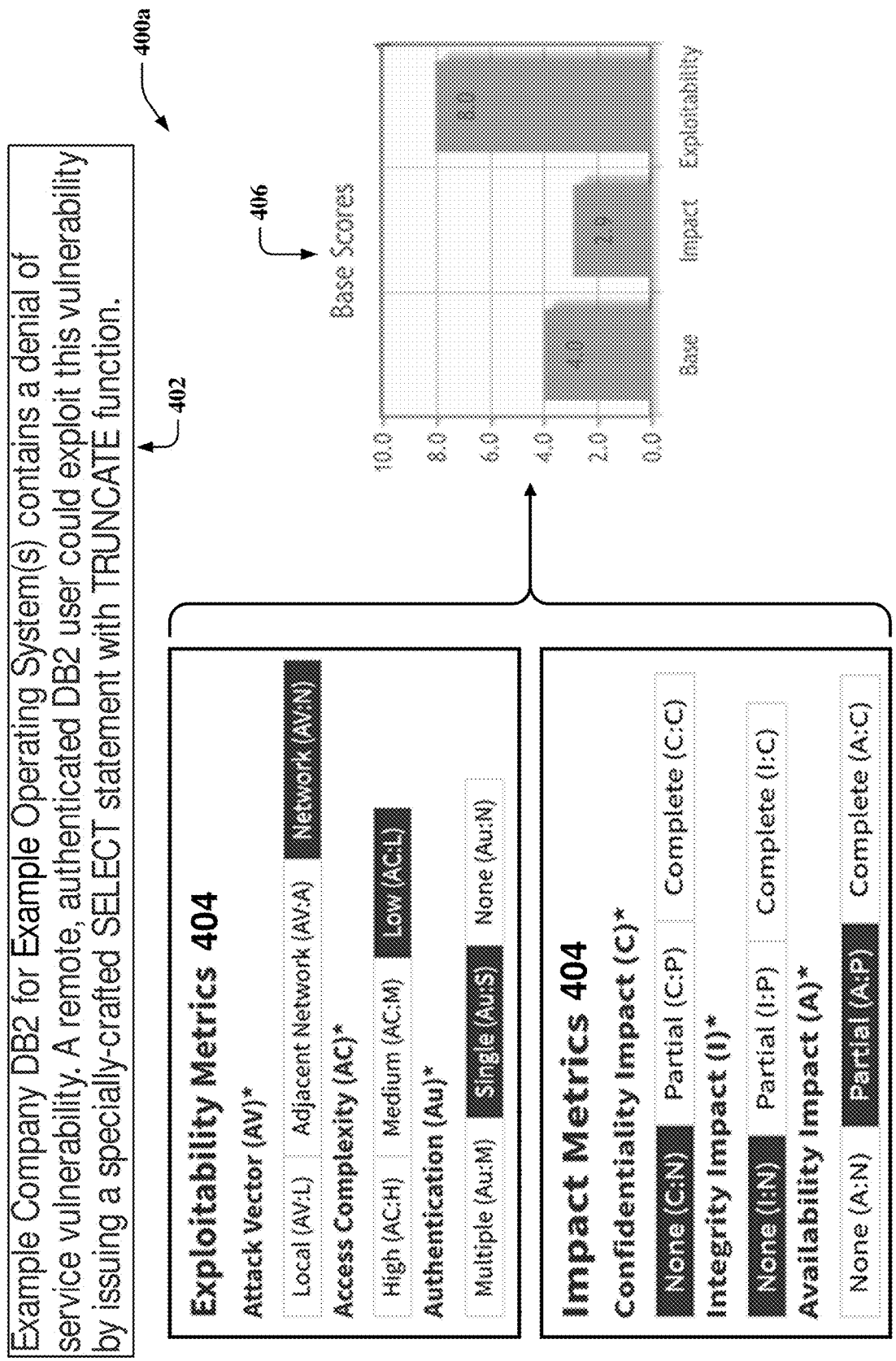
FIGS. 4A and 4B illustrate diagrams of example, non-limiting information that can facilitate compliance process risk assessment in accordance with one or more embodiments described herein.
Figure 4B:
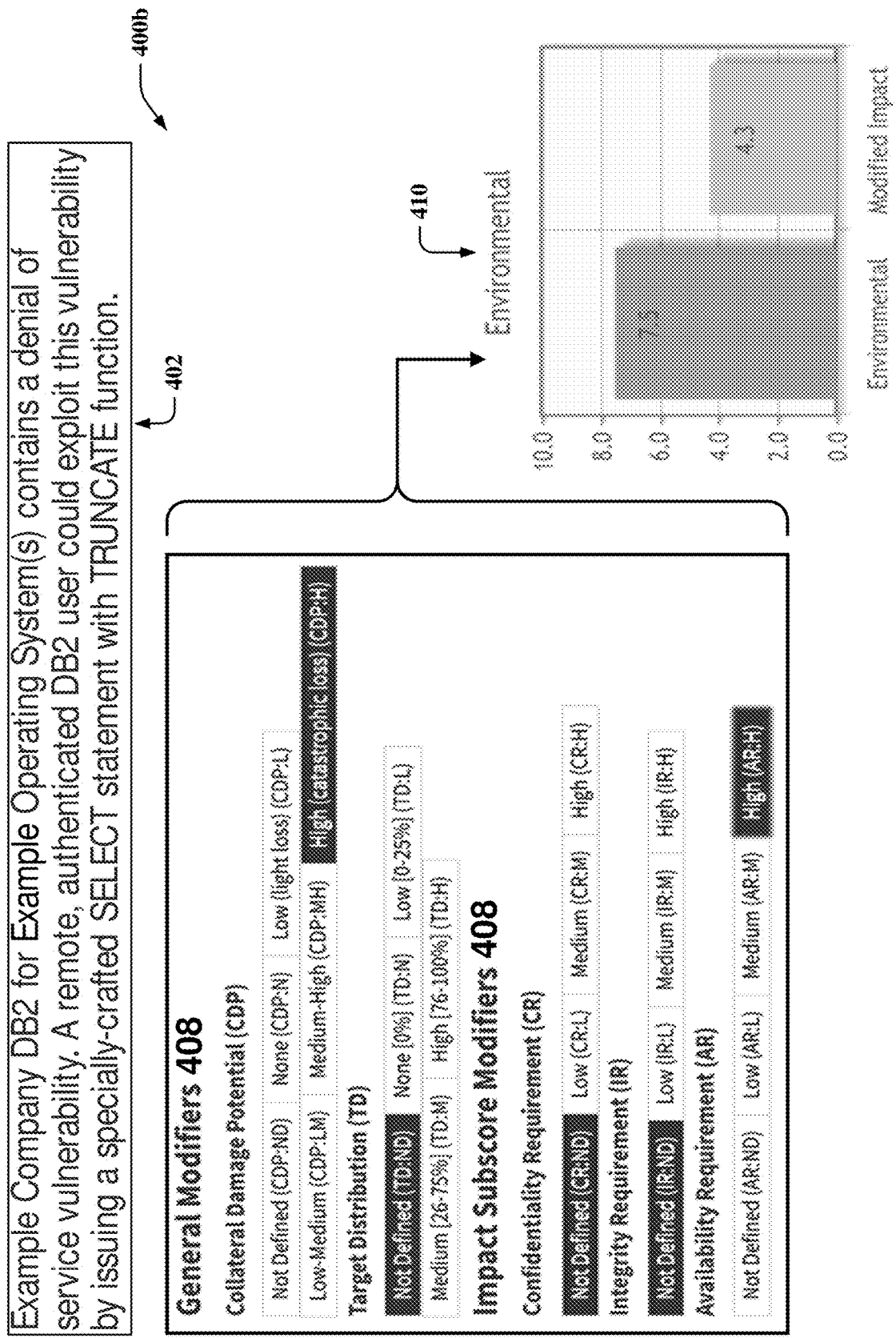
Figure 4C:
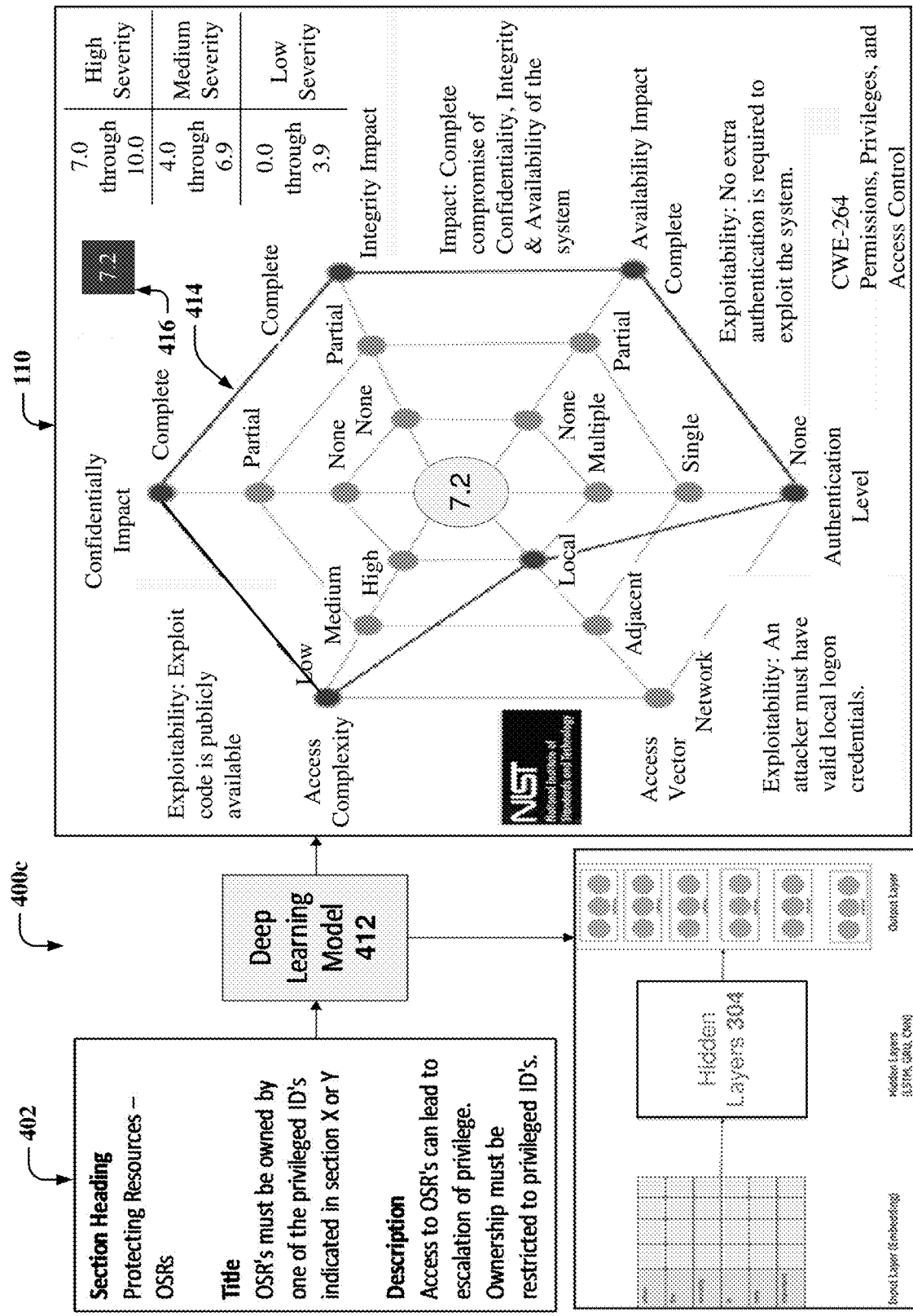
FIGS. 4C, 4D, 4E, and 4F illustrate block diagrams of example, non-limiting systems that can facilitate compliance process risk assessment in accordance with one or more embodiments described herein.

FIGS. 4A and 4B illustrate diagrams of example, non-limiting information 400a, 400b that can facilitate compliance process risk assessment in accordance with one or more embodiments described herein. In some embodiments, information 400a, 400b can be utilized in implementing one or more embodiments of the subject disclosure described herein to perform a patching process. Repetitive description of like elements and/or processes employed in respective embodiments is omitted for sake of brevity.

Information 400a (FIG. 4A) can comprise vulnerability description 402 that can be input to model 300a and/or 300b (e.g., via metric assignment component 108) to assign one or more risk assessment metrics comprising exploitability metrics and/or impact metrics 404 illustrated in FIG. 4A. Information 400a can further comprise chart 406 comprising one or more risk scores that can be assigned (e.g., via risk assignment component 110) based on such exploitability metrics and/or impact metrics 404. In an example, such risk scores can comprise a base score, an impact score, and/or an exploitability score as illustrated in FIG. 4A.

Information 400b (FIG. 4B) can also comprise vulnerability description 402 that can be input to model 300a and/or 300b (e.g., via metric assignment component 108) to assign one or more modifiers comprising general modifiers and/or impact subscore modifiers 408 illustrated in FIG. 4B that can affect one or more risk scores. Information 400b can further comprise chart 410 comprising one or more risk scores that can be assigned (e.g., via risk assignment component 110) based on such exploitability metrics and/or impact metrics 404 of information 400a and/or such general modifiers and/or impact subscore modifiers 408 of information 400b. In an example, such risk scores can comprise an environmental score and/or a modified impact score as illustrated in FIG. 4A.

FIG. 4C illustrates a block diagram of an example, non-limiting system 400c that can facilitate compliance process risk assessment in accordance with one or more embodiments described herein. In some embodiments, system 400c can comprise an illustration of a health check control example that can be implemented using one or more embodiments of the subject disclosure described herein to protect one or more operating system resources (denoted OSR in FIG. 4C) as illustrated in FIG. 4C. Repetitive description of like elements and/or processes employed in respective embodiments is omitted for sake of brevity.

System 400c can comprise a deep learning model 412 that can comprise one or more of the models defined above with reference to FIG. 1 (e.g., an ML model based on AI and NLP, a shallow or deep neural network model, an LSTM model, a GRU model, a CNN model, an SVM model, a decision tree classifier, any supervised or unsupervised machine learning model, etc.). Deep learning model 412 can comprise and/or employ metric assignment component 108 and/or risk assignment component 110 as illustrated in FIG. 4C. For example, deep learning model 412 can comprise and/or employ metric assignment component 108 to assign (e.g., via model 300a, model 300b, etc.) one or more risk assessment metrics 308 and/or 310 (not illustrated in FIG. 4C) based on vulnerability data 402 depicted in FIG. 4C. In another example, deep learning model 412 can comprise and/or employ risk assignment component 110 to assign one or more risk scores based on such one or more risk assessment metrics 308 and/or 310. For instance, deep learning model 412 can comprise and/or employ risk assignment component 110 to assign risk score 416 and/or generate spider diagram 414.

Figure 4D:
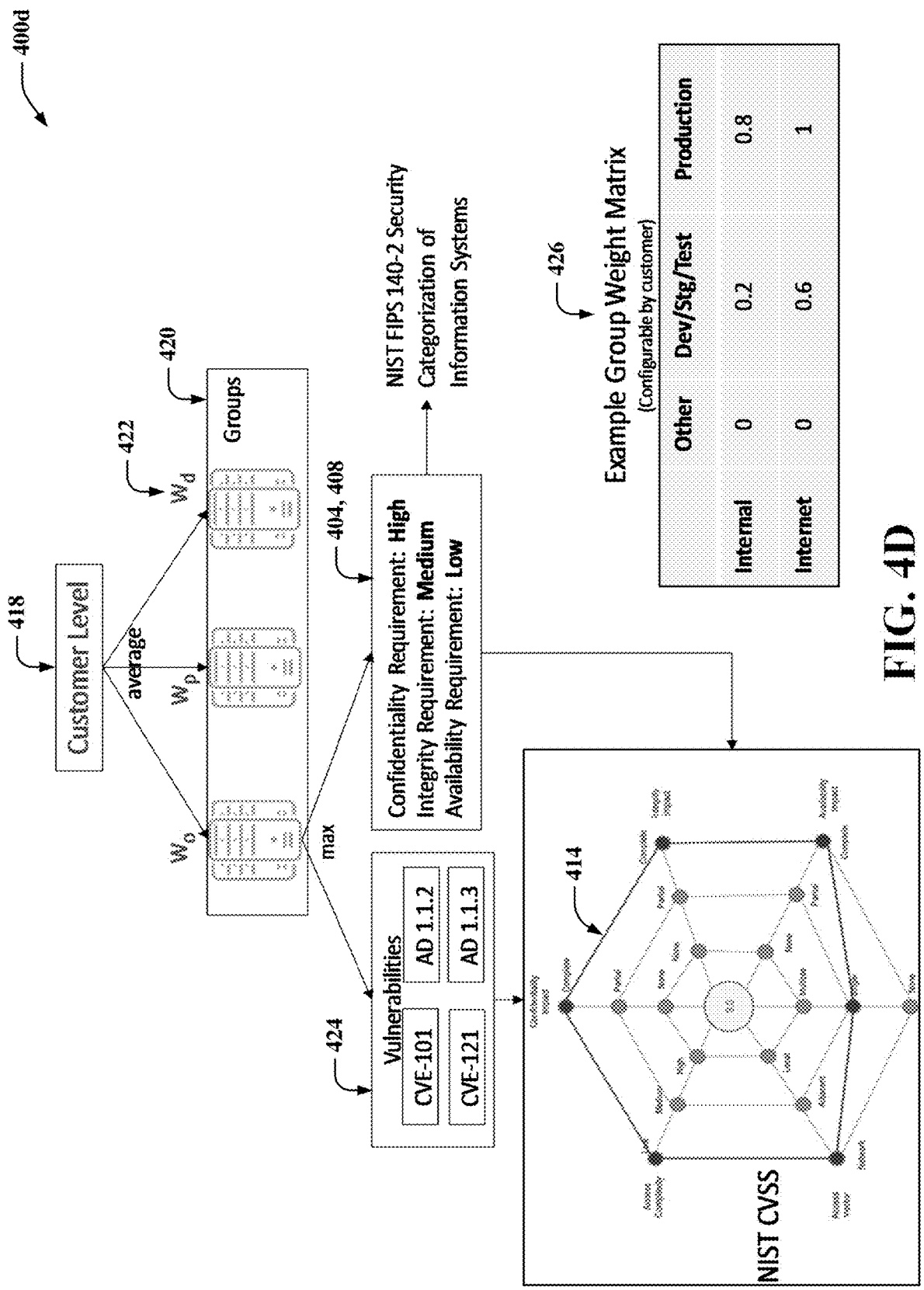

FIG. 4D illustrates a block diagram of an example, non-limiting system 400d that can facilitate compliance process risk assessment in accordance with one or more embodiments described herein. In some embodiments, system 400d can comprise an illustration of a device criticality accounting process that can be implemented using one or more embodiments of the subject disclosure described herein as illustrated in FIG. 4D. Repetitive description of like elements and/or processes employed in respective embodiments is omitted for sake of brevity.

System 400d can comprise a customer level 418 that can comprise one or more assets 420 and/or groups of assets 420 (denoted as Groups in FIG. 4D). In an example, such one or more assets 420 and/or groups of assets 420 can comprise servers. In an embodiment, compliance process risk assessment system 102 (e.g., via metric assignment component 108 and/or risk assignment component 110) can assign a risk score associated with each of assets 420 and/or groups of assets 420, where such risk score can be assigned based on one or more vulnerabilities 424, risk assessment metrics 404, and/or modifiers 408 that can correspond to one or more compliance processes and/or compliance process vulnerability scoring systems. For example, compliance process risk assessment system 102 (e.g., via metric assignment component 108 and/or risk assignment component 110) can assign a risk score associated with each of assets 420 and/or groups of assets 420, where such risk score can be assigned based on one or more vulnerabilities 424 that can correspond to one or more patching processes (denoted CVE-101 and CVE-121 in FIG. 4D) and/or health check control processes (denoted AD 1.1.2 and AD 1.1.3 in FIG. 4D). In this example, compliance process risk assessment system 102

(e.g., via metric assignment component 108 and/or risk assignment component 110) can assign a risk score associated with each of assets 420 and/or groups of assets 420, where such a risk score can be assigned based on risk assessment metrics 404 and/or modifiers 408 that can correspond to one or more compliance process vulnerability scoring system such as, for instance, the CVSS. In this example, compliance process risk assessment system 102 (e.g., via risk assignment component 110) can generate spider diagram 414 depicted in FIG. 4D based on the risk score assignment(s) described above.

In the example described above, based on such assignment of one or more risk scores as described above, compliance process risk assessment system 102 (e.g., via risk assignment component 110 and/or manager component 208) can determine a max risk score and/or an asset and/or a group of assets that have a max risk score associated with executing such a patching process and/or a health check control process. For example, compliance process risk assessment system 102 (e.g., via risk assignment component 110 and/or manager component 208) can determine the highest numerical value risk score of an asset and/or group of assets relative to other risks scores of other assets and/or groups of assets.

In the examples described above, compliance process risk assessment system 102 (e.g., via metric assignment component 108 and/or risk assignment component 110) can thereby assign a risk score associated with each of assets 420 and/or groups of such assets 420. In another example, compliance process risk assessment system 102 (e.g., via metric assignment component 108 and/or risk assignment component 110) can assign a risk score associated with customer level 418 by calculating an average of all risk scores of assets 420 and/or groups of assets 420. In another example, compliance process risk assessment system 102 (e.g., via metric assignment component 108 and/or risk assignment component 110) can assign a risk score associated with customer level 418 by calculating a weighted average of all risk scores of assets 420 and/or groups of assets 420 based on one or more weights 422 (denoted $W_o$, $W_p$, $W_d$ in FIG. 4D) corresponding to assets 420 and/or groups of assets 420. In this example, compliance process risk assessment system 102 (e.g., via risk assignment component 110, manager component 208, and/or customer level 418) can generate a weight matrix 426 based on such weighted average of all risk scores of assets 420 and/or groups of assets 420 that can be calculated as described above.

Figure 4E:
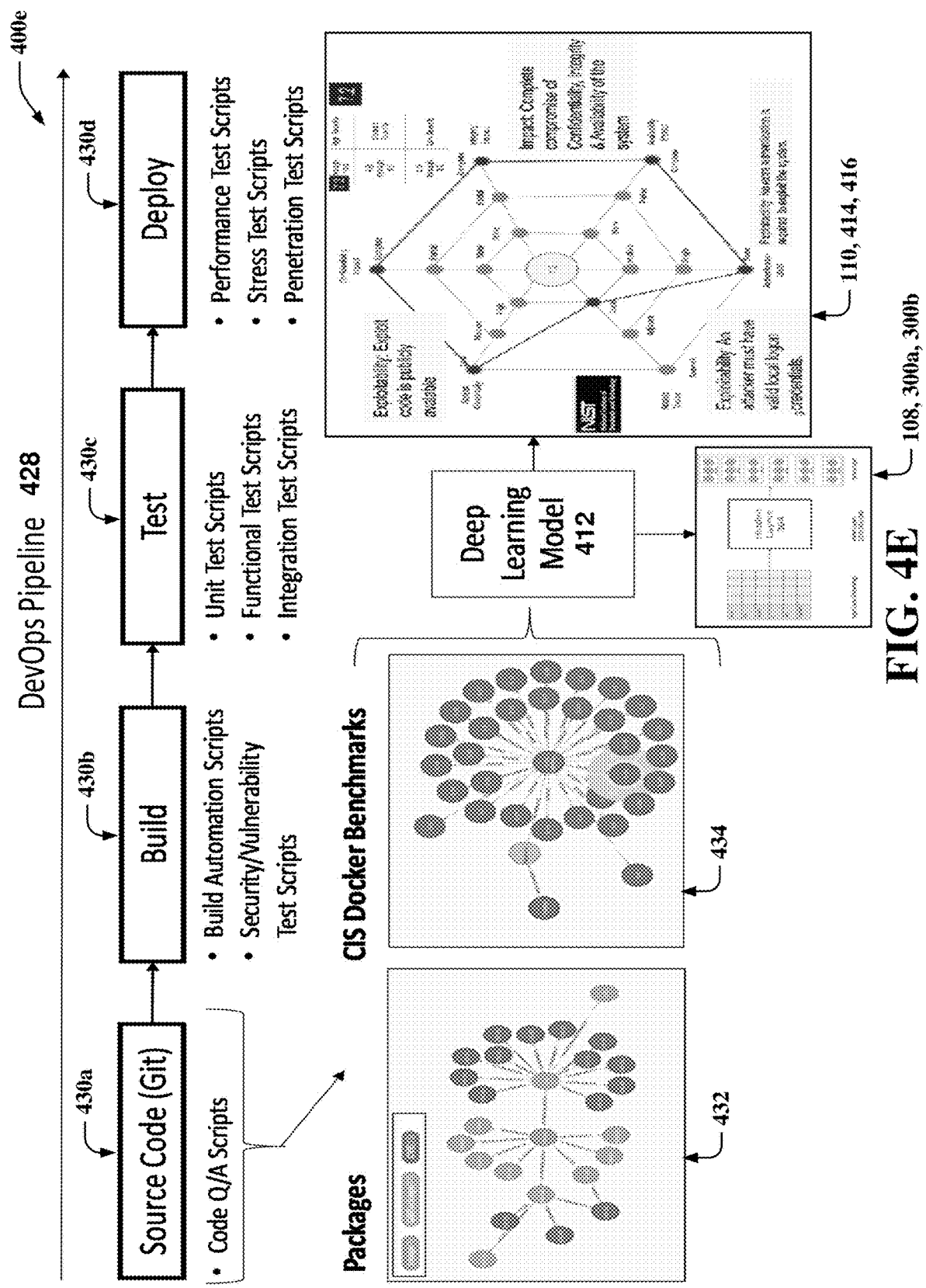

FIG. 4E illustrates a block diagram of an example, non-limiting system 400e that can facilitate compliance process risk assessment in accordance with one or more embodiments described herein. In some embodiments, system 400e can comprise an illustration of how risk scores can be calculated in a DevOps pipeline and/or a DevSecOps pipeline that can be implemented using one or more embodiments of the subject disclosure described herein as illustrated in FIG. 4E. Repetitive description of like elements and/or processes employed in respective embodiments is omitted for sake of brevity.

System 400e can comprise a DevOps pipeline 428 that can comprise one or more stages 430a, 430b, 430c, 430d (denoted as Source Code (Git), Build, Test, and Deploy, respectively, in FIG. 4E). In an example, a developer can develop software codes and push (e.g., load, save, etc.) such codes (e.g., applications) into a repository (e.g., a database) at stage 430a. In this example, when such codes are in such a repository, compliance process risk assessment system 102 (e.g., via deep learning model 412, metric assignment component 108, and/or risk assignment component 110 as illustrated in FIG. 4E) can assign one or more risk scores associated with such codes based on one or more packages 432 (illustrated in FIG. 4E as a dependency graph) that can comprise libraries used by such codes. In this example, when such codes are in such a repository, compliance process risk assessment system 102 (e.g., via deep learning model 412, metric assignment component 108, and/or risk assignment component 110 as illustrated in FIG. 4E) can further assign one or more risk scores associated with such codes (e.g., applications) based on one or more internet security docker benchmarks 434 (illustrated in FIG. 4E as a dependency graph) that can comprise configuration requirements (e.g., technical check specifications (tech check specs)) that can be used by such codes in the repository.

In some embodiments, based on such risk score assignment(s) of source codes in a repository as described in the examples above, one or more subsequent stages of DevOps pipeline 428 can utilize such risk scores to perform one or more operations illustrated in FIG. 4E that are associated with such stages and/or determine (e.g., via deep learning model 412, metric assignment component 108, and/or risk assignment component 110) one or more risks associated with such operations. For example, based on such risk score assignment(s) of source codes in a repository as described in the examples above, stages 430b, 430c, and/or 430d can utilize such risk scores to build, test, and/or deploy, respectively, such source codes and/or determine (e.g., via deep learning model 412, metric assignment component 108, and/or risk assignment component 110) one or more risks associated with the operations illustrated in FIG. 4E that are associated with each of such stages.

Figure 4F:
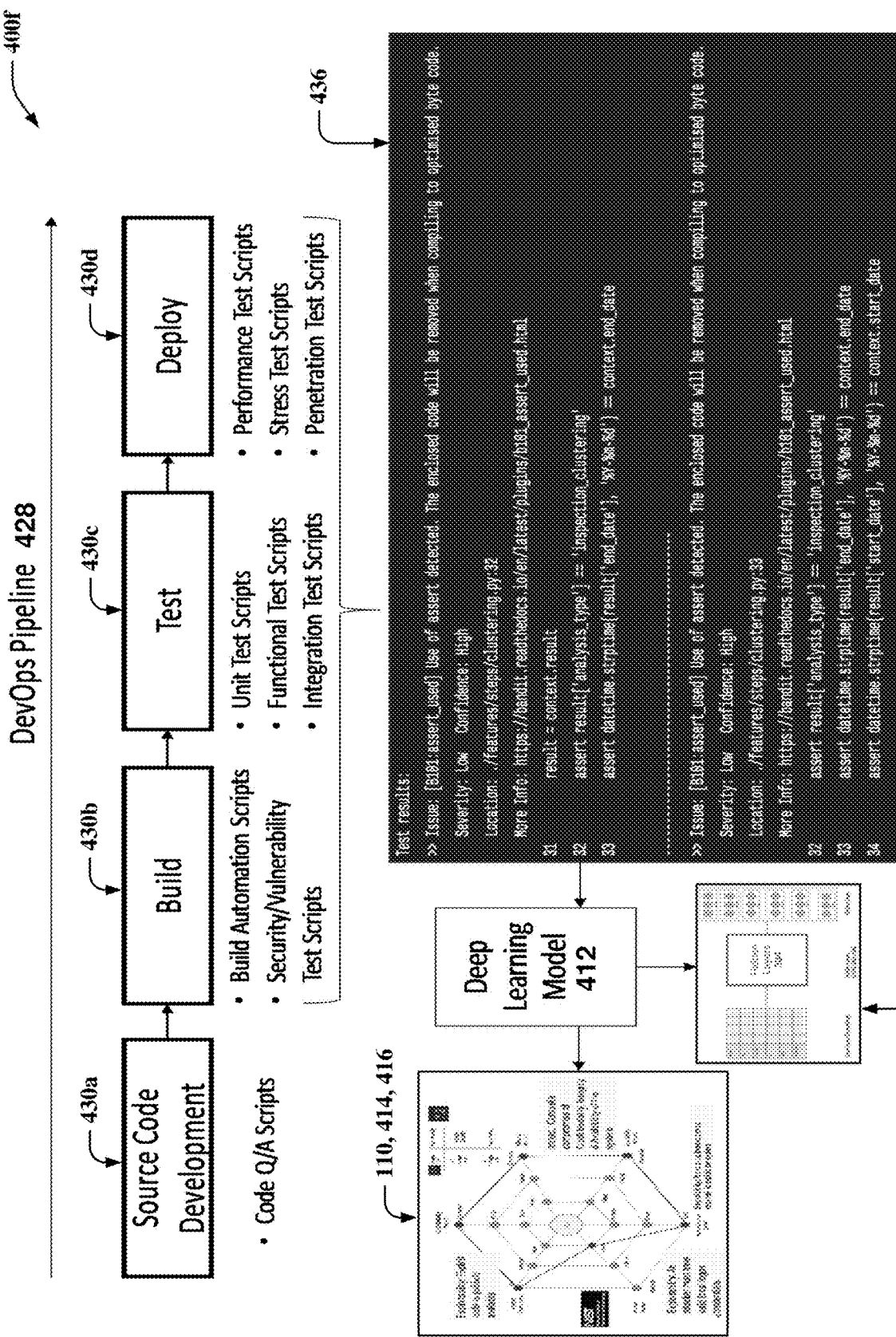

FIG. 4F illustrates a block diagram of an example, non-limiting system 400f that can facilitate compliance process risk assessment in accordance with one or more embodiments described herein. In some embodiments, system 400f can comprise an illustration of how risk scores can be calculated in a DevOps pipeline and/or a DevSecOps pipeline that can be implemented using one or more embodiments of the subject disclosure described herein as illustrated in FIG. 4F. Repetitive description of like elements and/or processes employed in respective embodiments is omitted for sake of brevity.

System 400f can comprise DevOps pipeline 428 and/or stages 430a, 430b, 430c, 430d with respective corresponding operations of each stage as illustrated in FIG. 4F. System 400f can further comprise a static scan 436 that can be generated during the build, test, and/or deploy stages (e.g., stages 430b, 430c, 430d) of DevOps pipeline 428. In an example, static scan can identify one or more vulnerabilities such as, for instance, security vulnerabilities in software codes developed by a developer as described above with reference to FIG. 4E. In this example, when such source codes are in a repository as described above with reference to FIG. 4E, compliance process risk assessment system 102 (e.g., via deep learning model 412, metric assignment component 108, and/or risk assignment component 110 as illustrated in FIG. 4F) can assign one or more risk scores corresponding to such security vulnerabilities identified in static scan 436.

In some embodiments, based on such risk score assignment(s) of such security vulnerabilities in static scan 436, one or more other stages of DevOps pipeline 428 can utilize such risk scores to perform one or more operations illustrated in FIG. 4F that are associated with such stages and/or determine (e.g., via deep learning model 412, metric assignment component 108, and/or risk assignment component 110) one or more risks associated with such operations. For example, based on such risk score assignment(s) of such security vulnerabilities in static scan 436 as described in the examples above, stages 430b, 430c, and/or 430d can utilize such risk scores to build, test, and/or deploy, respectively, source codes in the repository and/or determine (e.g., via deep learning model 412, metric assignment component 108, and/or risk assignment component 110) one or more risks associated with the operations illustrated in FIG. 4F that are associated with each of such stages.

Figure 5A:
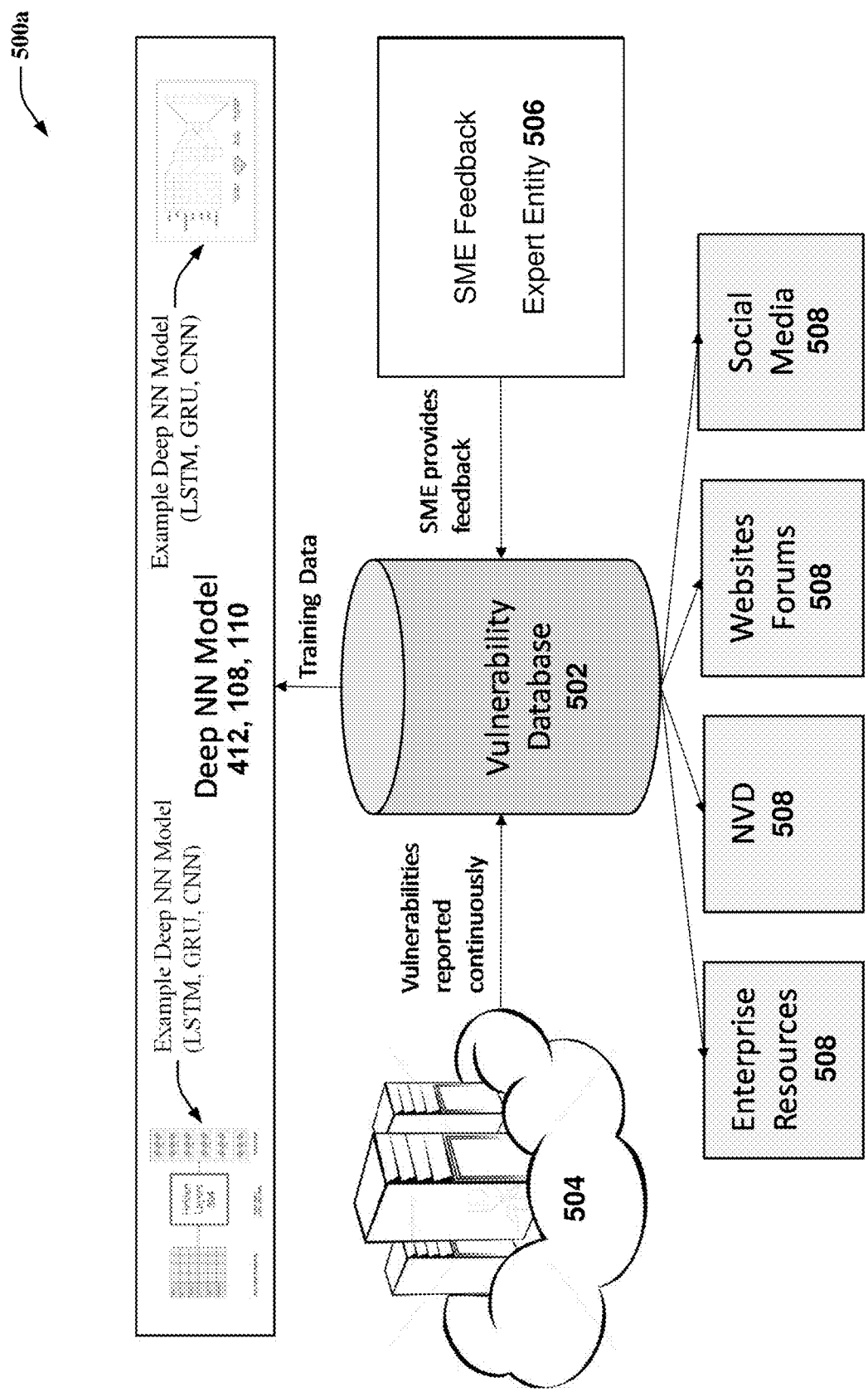
FIG. 5A illustrates a block diagram of an example, non-limiting system that can facilitate compliance process risk assessment in accordance with one or more embodiments described herein.

FIG. 5A illustrates a block diagram of an example, non-limiting system 500a that can facilitate compliance process risk assessment in accordance with one or more embodiments described herein. In some embodiments, system 500a can illustrate one or more training methods that can be implemented to train a model (e.g., deep learning model 412) that can be employed via one or more embodiments of the subject disclosure described herein, where such training methods can comprise initial training of such a model using historical vulnerability data and/or active training using expert feedback data and/or operational feedback data. Repetitive description of like elements and/or processes employed in respective embodiments is omitted for sake of brevity.

In some embodiments, system 500a can comprise deep learning model 412 (denoted as Deep NN Model in FIG. 5A), a vulnerability database 502 that can comprise memory 104, one or more computing resources 504, an expert entity 506, and/or one or more data resources 508. In an embodiment, deep learning model 412 can comprise metric assignment component 108 and/or risk assignment component 110. In an example, such one or more data resources 508 can comprise enterprise resources, the National Vulnerability Database (NVD), website forums, and/or social media that can comprise vulnerability data that can be used to train deep learning model 412. In an embodiment, as described above with reference to FIG. 2, collection component 202 can collect such vulnerability data from such one or more data resources 508, which can be stored on vulnerability database 502.

In an example, deep learning model 412 (e.g., via metric assignment component 108 and/or risk assignment component 110) can assign one or more risk assessment metrics and/or risk score(s), respectively, based on at least one of expert feedback or operational data feedback. In some embodiments, deep learning model 412 (e.g., via metric assignment component 108 and/or risk assignment component 110) can assign such one or more risk assessment metrics and/or one or more risk scores based on expert feedback received from expert entity 506 and/or operational data feedback (e.g., vulnerabilities received from computing resources 504 that can be discovered from change requests and/or tickets during execution of various source code and/or applications). In these embodiments, such expert feedback and/or operation data feedback can be stored on vulnerabilities database 502 and/or utilized to actively train such a model (e.g., via trainer component 204 as described above with reference to FIG. 2) and/or to update a risk score and/or an aggregate risk score(s) (e.g., via update component 206 as described above with reference to FIG. 2).

Expert entity 506 can comprise an expert entity including, but not limited to, a human, a computing device, a software application, an expert agent, a machine learning (ML) model, an artificial intelligence (AI) model, and/or another expert entity. In some embodiments, deep learning model 412 (e.g., via metric assignment component 108 and/or risk assignment component 110) can assign a risk score of a compliance process and/or an aggregate risk score of a collection of different compliance processes as described above with reference to FIG. 1 and provide the same to expert entity 506 to verify (e.g., validate or invalidate) the accuracy of such score(s). For example, expert entity 506 can verify the accuracy of such risk score(s) based on, for instance, human experience (e.g., experience of a human expert such as, for instance, a subject matter expert (SME)), historical risk scores and/or historical aggregate risk scores that have been previously verified (e.g., by the expert entity), and/or other data.

In some embodiments, compliance process risk assessment system 102 can present to expert entity 506 one or more risk scores and/or one or more aggregate risk scores assigned by deep learning model 412 (e.g., via metric assignment component 108 and/or risk assignment component 110) and/or receive feedback data from expert entity 506 corresponding to the accuracy of such risk score(s). For example, compliance process risk assessment system 102 can comprise an interface component including, but not limited to, an application programming interface (API), a graphical user interface (GUI), and/or another interface component that can present (e.g., via a computer monitor, a display, a screen, etc.) such risk score(s) to expert entity 506 and/or receive feedback data from expert entity 506 corresponding to the accuracy of such risk score(s). For instance, compliance process risk assessment system 102 can comprise an interface component that can present such risk score(s) to expert entity 506 by displaying it on a computer monitor, for example, and/or can receive feedback data from expert entity 506 via one or more input controls of such an interface component (e.g., input controls of a GUI) such as, for example, a text field, a button, a seek bar, a checkbox, a toggle button, a zoom button, and/or another input control.

Figure 5B:
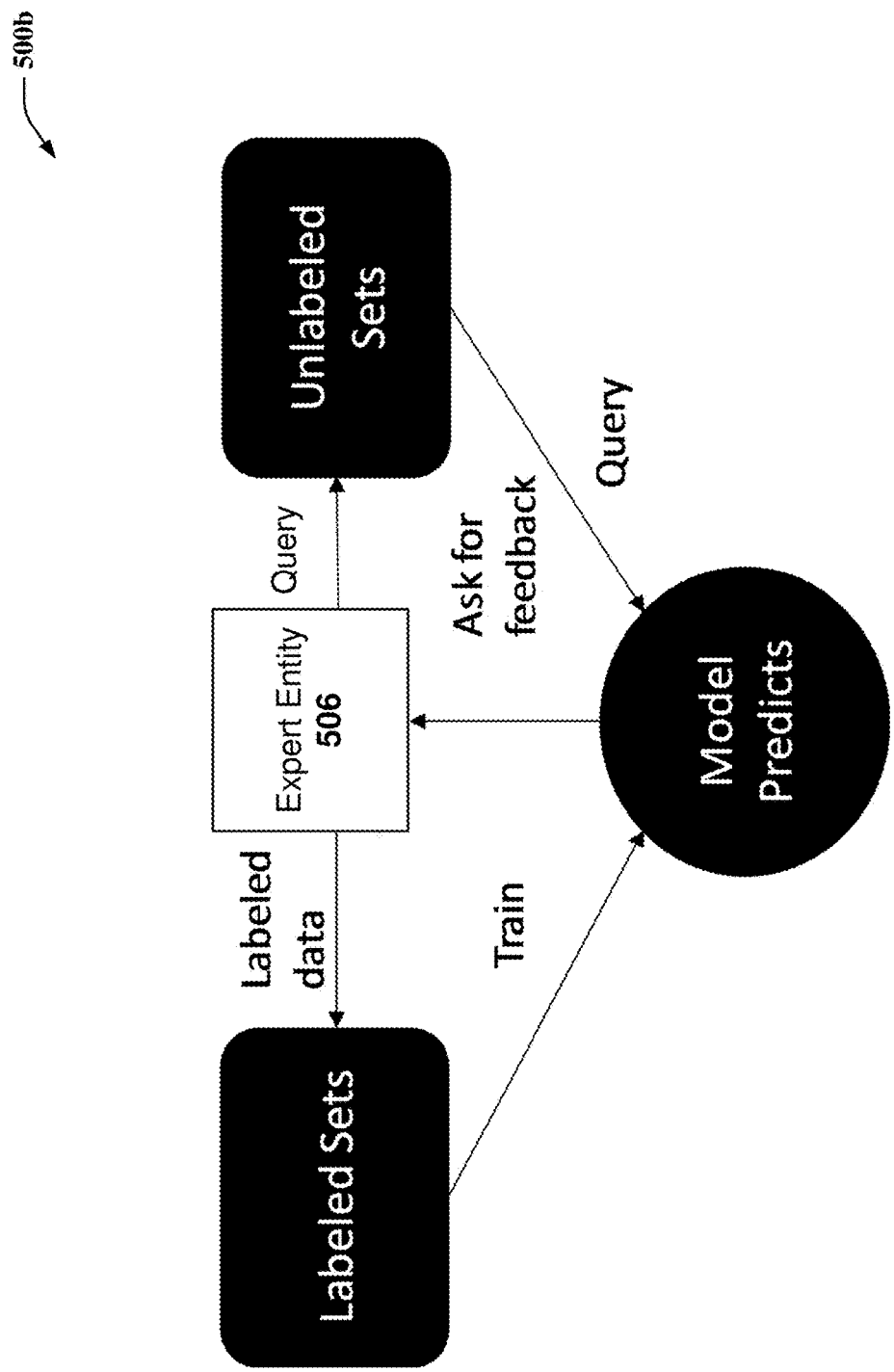
FIG. 5B illustrates a diagram of an example, non-limiting system that can facilitate compliance process risk assessment in accordance with one or more embodiments described herein.

FIG. 5B illustrates a diagram of an example, non-limiting system 500b that can facilitate compliance process risk assessment in accordance with one or more embodiments described herein. Repetitive description of like elements and/or processes employed in respective embodiments is omitted for sake of brevity.

In some embodiments, system 500b can comprise an illustration of how compliance process risk assessment system 102 (e.g., via metric assignment component 108, risk assignment component 110, trainer component 204, update component 206, model 300a, model 300b, deep learning model 412, expert entity 506, etc.) can actively learn to assign one or more risk assessment metrics of one or more compliance process vulnerability scoring systems and/or one or more risk scores to one or more compliance processes in accordance with one or more embodiments of the subject disclosure described herein. For example, system 500b can comprise an illustration of how compliance process risk assessment system 102 (e.g., via metric assignment component 108, risk assignment component 110, trainer component 204, update component 206, model 300a, model 300b, deep learning model 412, expert entity 506, etc.) can actively learn to assign one or more risk assessment metrics of one or more compliance process vulnerability scoring systems and/or one or more risk scores to one or more compliance process using, for instance, algorithm (2) defined below.

Algorithm (2)
Inputs: Labeled set $D_1$, submitted description of vulnerability $P_i$.
Train a classifier $f_1$ based on training data $D_1$
while True
Predict a score $(S_i)$ for $P_i$.
Use feedback from SME to validate that $S_i$ is correct.
Update training data $(D_1)$ with vulnerability description $P_i$ and its label if necessary.
Retrain a classifier $f_i$ using $D_1$.

Figure 6:
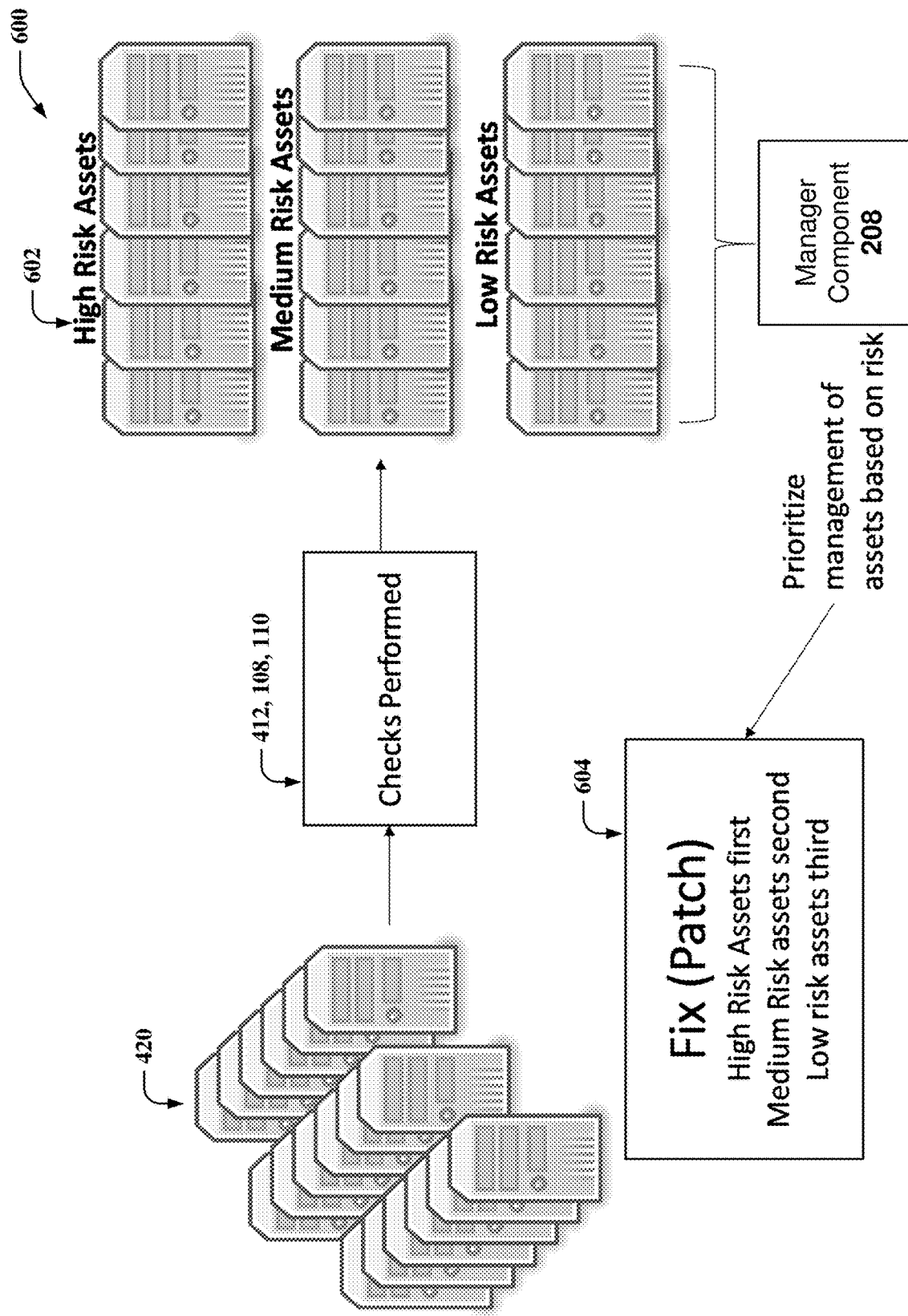
FIG. 6 illustrates a diagram of an example, non-limiting system that can facilitate compliance process risk assessment in accordance with one or more embodiments described herein.

FIG. 6 illustrates a diagram of an example, non-limiting system 600 that can facilitate compliance process risk assessment in accordance with one or more embodiments described herein. Repetitive description of like elements and/or processes employed in respective embodiments is omitted for sake of brevity.

In an embodiment, system 600 illustrates how manager component 208 can assign a level of priority to management of an asset of a compliance process based on a risk score as described above with reference to FIG. 2. For example, manager component 208 can assign a level of priority 602 (e.g., high risk assets first, medium risk assets second, low risk assets third, etc.) to management of one or more assets 420 associated with (e.g., subject to, affected by, etc.) execution of a compliance process based on a risk score corresponding to the compliance process that can be assigned by risk assignment component 110 as described above with reference to FIG. 1. In some embodiments, manager component 208 can assign a level of priority 602 to management of one or more assets 420 associated with (e.g., subject to, affected by, etc.) execution of a collection of different compliance processes based on an aggregate risk score corresponding to the collection of different compliance processes. In an example, manager component 208 can comprise an asset manager entity including, but not limited to, a human, a computing device, a software application, an asset manager agent, a machine learning (ML) model, an artificial intelligence (AI) model, and/or another asset manager entity.

In an example illustrated by system 600 in FIG. 6, where such a risk score and/or aggregate risk score indicates that certain assets of assets 420 have higher risk to vulnerabilities relative to other assets of assets 420, manager component 208 can execute one or more compliance processes 604 (e.g., a patch process) affecting such higher risk assets before executing such compliance process(es) affecting lower risk assets. In another example, where such a risk score and/or aggregate risk score indicates that certain assets of assets 420 have lower risk to vulnerabilities relative to other assets of assets 420, manager component 208 can execute one or more compliance processes 604 (e.g., a patch process) affecting such lower risk assets before executing such compliance process(es) affecting higher risk assets.

Compliance process risk assessment system 102 can be associated with various technologies. For example, compliance process risk assessment system 102 can be associated with artificial intelligence technologies, machine learning technologies, compliance process management and scheduling, data analytics technologies, computer technologies, server technologies, information technology (IT) technologies, internet-of-things (IoT) technologies, automation technologies, and/or other technologies.

In some embodiments, compliance process risk assessment system 102 can provide technical improvements to systems, devices, components, operational steps, and/or processing steps associated with the various technologies identified above. For example, compliance process risk assessment system 102 can automatically: assign (e.g., via deep learning model 412, metric assignment component 108, risk assignment component 110, etc.) an aggregate risk score of different compliance processes based on risk assessment metrics of different compliance process vulnerability scoring systems, thereby facilitating a standard risk assessment scoring system; and/or assign (e.g., via manager component 208) a level of priority to management of one or more assets of the different compliance processes based on the aggregate risk score, thereby facilitating at least one of reduced impact to or exploitation of vulnerabilities (e.g., defects) that can affect such one or more assets.

In some embodiments, compliance process risk assessment system 102 can provide technical improvements to a processing unit (e.g., processor 106) associated with a classical computing device and/or a quantum computing device (e.g., a quantum processor, quantum hardware, superconducting circuit, etc.). For example, by reducing the impact to and/or exploitation of vulnerabilities (e.g., defects) that can affect one or more assets as described above, where such one or more assets can comprise such a processing unit (e.g., processor 106) described above, compliance process risk assessment system 102 can thereby provide technical improvements to the processing unit (e.g., processor 106) by reducing the impact to and/or exploitation of vulnerabilities (e.g., defects) that can affect such a processing unit (e.g., processor 106). In this example, such reduction of the impact to and/or exploitation of vulnerabilities (e.g., defects) that can affect such a processing unit (e.g., processor 106) associated with compliance process risk assessment system 102 can facilitate improved accuracy, efficiency, and/or performance of the processing unit (e.g., processor 106), as well as reduced computation cost of such a processing unit.

In some embodiments, compliance process risk assessment system 102 can employ hardware or software to solve problems that are highly technical in nature, that are not abstract and that cannot be performed as a set of mental acts by a human. In some embodiments, some of the processes described herein can be performed by one or more specialized computers (e.g., one or more specialized processing units, a specialized quantum computer, etc.) for carrying out defined tasks related to the various technologies identified above. In some embodiments, compliance process risk assessment system 102 and/or components thereof, can be employed to solve new problems that arise through advancements in technologies mentioned above, employment of quantum computing systems, cloud computing systems, computer architecture, and/or another technology.

It is to be appreciated that compliance process risk assessment system 102 can utilize various combinations of electrical components, mechanical components, and circuitry that cannot be replicated in the mind of a human or performed by a human, as the various operations that can be executed by compliance process risk assessment system 102 and/or components thereof as described herein are operations that are greater than the capability of a human mind. For instance, the amount of data processed, the speed of processing such data, or the types of data processed by compliance process risk assessment system 102 over a certain period of time can be greater, faster, or different than the amount, speed, or data type that can be processed by a human mind over the same period of time.

According to several embodiments, compliance process risk assessment system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that compliance process risk assessment system 102 can include information that is impossible to obtain manually by an entity, such as a human user. For example, the type, amount, or variety of information included in compliance process risk assessment system 102, metric assignment component 108, risk assignment component 110, collection component 202, trainer component 204, update component 206, manager component 208, model 300a, model 300b, and/or deep learning model 412 can be more complex than information obtained manually by a human user.

Figure 7A:
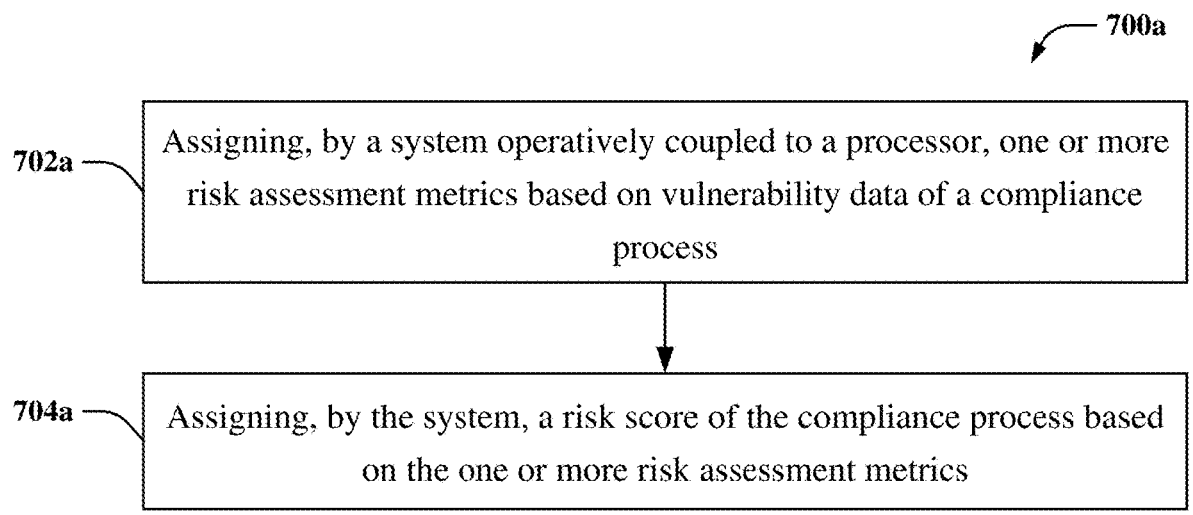
FIGS. 7A and 7B illustrate flow diagrams of example, non-limiting computer-implemented methods that can facilitate compliance process risk assessment in accordance with one or more embodiments described herein.

FIG. 7A illustrates a flow diagram of an example, non-limiting computer-implemented method 700a that can facilitate compliance process risk assessment in accordance with one or more embodiments described herein. Repetitive description of like elements and/or processes employed in respective embodiments is omitted for sake of brevity.

In some embodiments, at 702a, computer-implemented method 700a can comprise assigning, by a system (e.g., via compliance process risk assessment system 102 and/or metric assignment component 108) operatively coupled to a processor (e.g., processor 106, a quantum processor, etc.), one or more risk assessment metrics (e.g., risk assessment metric(s) defined above with reference to FIG. 1) based on vulnerability data (e.g., vulnerability descriptions, vulnerability categories, vulnerability scores) of a compliance process (e.g., patching, health check control, identity and access management, etc.).

In some embodiments, at 704a, computer-implemented method 700a can comprise assigning, by the system (e.g., via compliance process risk assessment system 102 and/or risk assignment component 110), a risk score (e.g., a numerical value, a spider diagram, etc.) of the compliance process based on the one or more risk assessment metrics.

Figure 7B:
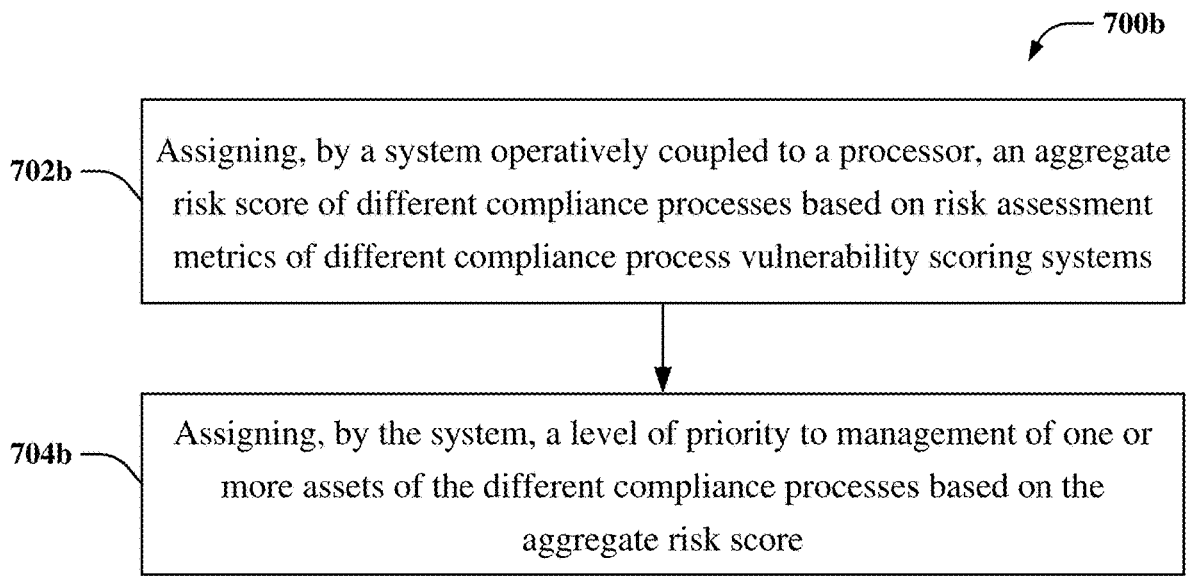

FIG. 7B illustrates a flow diagram of an example, non-limiting computer-implemented method 700b that can facilitate compliance process risk assessment in accordance with one or more embodiments described herein. Repetitive description of like elements and/or processes employed in respective embodiments is omitted for sake of brevity.

In some embodiments, at 702b, computer-implemented method 700b can comprise assigning, by a system (e.g., via compliance process risk assessment system 102 and/or risk assignment component 110) operatively coupled to a processor (e.g., processor 106, a quantum processor, etc.), an aggregate risk score (e.g., an average score, a weighted average score, etc.) of different compliance processes (e.g., patching, health check control, identity and access management, etc.) based on risk assessment metrics (e.g., assigned by metric assignment component 108 and defined above with reference to FIG. 1) of different compliance process vulnerability scoring systems (e.g., the CVSS, etc.).

In some embodiments, at 704b, computer-implemented method 700b can comprise assigning, by the system (e.g., via compliance process risk assessment system 102 and/or manager component 208), a level of priority (e.g., high risk assets first, medium risk assets second, low risk assets third, etc.) to management of one or more assets (e.g., servers, groups of servers, etc.) of the different compliance processes based on the aggregate risk score.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
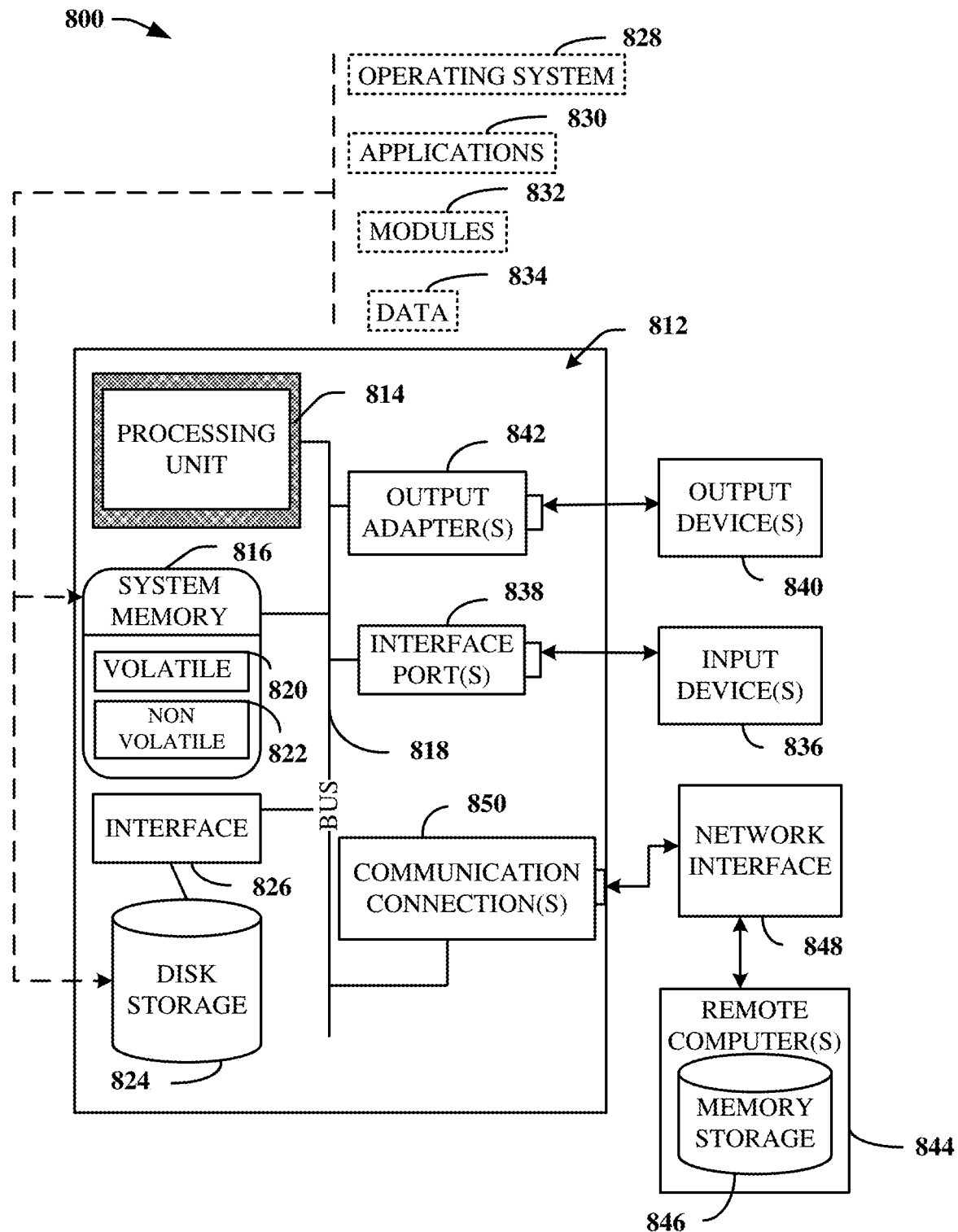
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
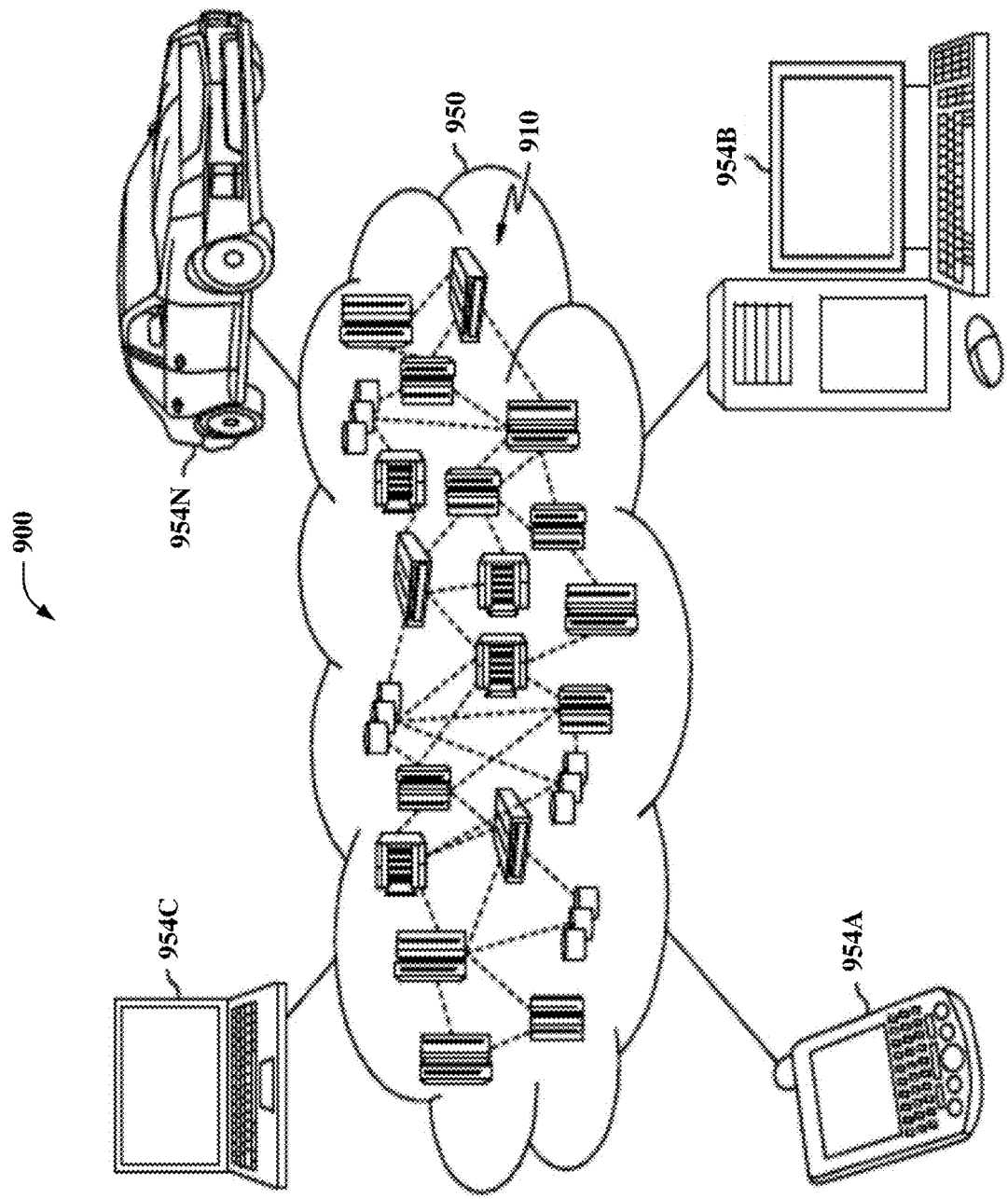
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
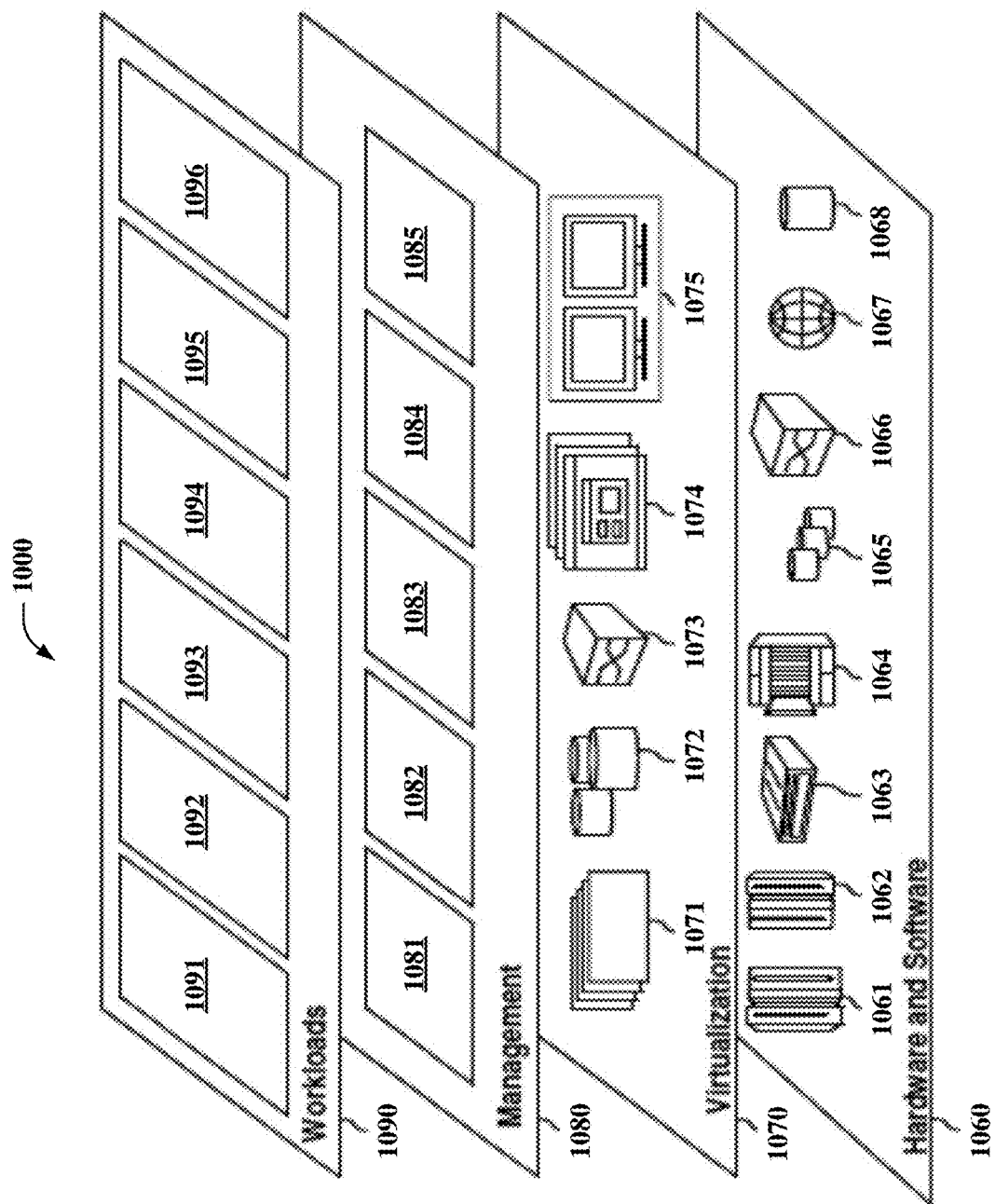
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and compliance process risk assessment software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a trainer component that trains a machine-learning model to assign one or more risk scores to one or more compliance processes based on respective groups of risk assessment metrics of different compliance process vulnerability scoring systems;
a metric assignment component that assigns, using the machine-learning model, one or more risk assessment metrics of the respective groups of risk assessment metrics based on vulnerability data of a compliance process; and
a risk assignment component that assigns, using the machine-learning model, the one or more risk scores to the one or more compliance processes based on the one or more risk assessment metrics and one or more score modifiers.

2. The system of claim 1, wherein the computer executable components further comprise:
a collection component that collects historical vulnerability data comprising at least one of vulnerability descriptions, vulnerability categories, or vulnerability scores corresponding to vulnerabilities of the compliance processes.

3. The system of claim 1, wherein the trainer component trains the machine-learning model based on at least one of historical vulnerability data, expert feedback, operational data feedback, or transfer learning data.

4. The system of claim 1, wherein the risk assignment component adjusts the risk score based on feedback data corresponding to the risk score.

5. The system of claim 1, wherein the computer executable components further comprise:
an update component that adds at least one of the vulnerability data or the risk score to a vulnerability database.

6. The system of claim 1, wherein the computer executable components further comprise:
a manager component that assigns a level of priority to management of an asset of the compliance process based on the risk score, thereby facilitating at least one of reduced impact to or exploitation of vulnerabilities of the asset.

7. The system of claim 1, wherein the risk assessment metrics comprise at least one of exploitability metrics or impact metrics of a compliance process vulnerability scoring system, and wherein the compliance process comprises at least one of: a security process; a patching process; an identity and access management process; a development and operations process; a development, security, and operations process; or a runtime process.

8. A computer-implemented method, comprising:
training, by a system operatively coupled to a processor, a machine-learning model to assign one or more risk scores to one or more compliance processes based on respective groups of risk assessment metrics of different compliance process vulnerability scoring systems;
assigning, by the system, using the machine-learning model, one or more risk assessment metrics of the respective groups of risk assessment metrics based on vulnerability data of a compliance process; and
assigning, by the system, using the machine-learning model, the one or more risk scores to the one or more compliance processes based on the one or more risk assessment metrics and one or more score modifiers.

9. The computer-implemented method of claim 8, further comprising:
collecting, by the system, historical vulnerability data comprising at least one of vulnerability descriptions, vulnerability categories, or vulnerability scores corresponding to vulnerabilities of the compliance processes.

10. The computer-implemented method of claim 8, wherein the training is based on at least one of historical vulnerability data, expert feedback, operational data feedback, or transfer learning data.

11. The computer-implemented method of claim 8, further comprising:
adjusting, by the system, the risk score based on feedback data corresponding to the risk score.

12. The computer-implemented method of claim 8, further comprising:
adding, by the system, at least one of the vulnerability data or the risk score to a vulnerability database.

13. The computer-implemented method of claim 8, further comprising:
assigning, by the system, a level of priority to management of an asset of the compliance process based on the risk score, thereby facilitating at least one of reduced impact to or exploitation of vulnerabilities of the asset.

14. A computer program product facilitating compliance process risk assessment, the computer program product comprising a computer readable storage medium having program instructions embodied therewith, the program instructions executable by a processor to cause the processor to:
train, by the processor, a machine-learning model to assign one or more risk scores to one or more compliance processes based on respective groups of risk assessment metrics of different compliance process vulnerability scoring systems;
assign, by the processor, using the machine-learning model, one or more risk assessment metrics of the respective groups of risk assessment metrics based on vulnerability data of a compliance process; and
assign, by the processor, using the machine-learning model, one or more risk scores of the one or more compliance processes based on the one or more risk assessment metrics and one or more score modifiers.

15. The computer program product of claim 14, wherein the program instructions are further executable by the processor to cause the processor to:
collect, by the processor, historical vulnerability data comprising at least one of vulnerability descriptions, vulnerability categories, or vulnerability scores corresponding to vulnerabilities of the compliance processes.

16. The computer program product of claim 14, wherein the training is based on at least one of historical vulnerability data, expert feedback, operational data feedback, or transfer learning data.

17. The computer program product of claim 14, wherein the program instructions are further executable by the processor to cause the processor to:
adjust, by the processor, the risk score based on feedback data corresponding to the risk score.

18. The computer program product of claim 14, wherein the program instructions are further executable by the processor to cause the processor to:
   add, by the processor, at least one of the vulnerability data or the risk score to a vulnerability database.

19. The computer program product of claim 14, wherein the program instructions are further executable by the processor to cause the processor to:
   assign, by the processor, a level of priority to management of an asset of the compliance process based on the risk score.

20. A system, comprising:
   a memory that stores computer executable components; and
   a processor that executes the computer executable components stored in the memory, wherein the computer executable components comprise:
      a trainer component that trains a machine-learning model to assign one or more aggregate risk scores to one or more groups of compliance processes based on respective groups of risk assessment metrics of different compliance process vulnerability scoring systems;
      a risk assignment component that assigns, using the machine-learning model, the one or more aggregate risk scores to the one or more groups of compliance processes based on the respective groups of risk assessment metrics of the different compliance process vulnerability scoring systems and one or more score modifiers; and
      a manager component that assigns a level of priority to management of one or more assets of a group of the one or more groups of compliance processes based on the aggregate risk score.

21. The system of claim 20, wherein the computer executable components further comprise:
   a metric assignment component that assigns the risk assessment metrics based on vulnerability data of the group of compliance processes.

22. The system of claim 21, wherein the trainer component trains the machine-learning model based on at least one of historical vulnerability data, expert feedback, operational data feedback, or transfer learning data, thereby facilitating at least one of improved accuracy, efficiency, or performance of at least one of the risk assignment component, the manager component, or the processor.

23. A computer-implemented method, comprising:
   training, by a system operatively coupled to a processor, a machine-learning model to assign one or more aggregate risk scores to one or more groups of compliance processes based on respective groups of risk assessment metrics of different compliance process vulnerability scoring systems;
   assigning, by the system, using the machine-learning model, the one or more aggregate risk scores to the one or more groups of compliance processes based on the respective groups of risk assessment metrics of the different compliance process vulnerability scoring systems and one or more score modifiers; and
   assigning, by the system, a level of priority to management of one or more assets of a group of the one or more groups of compliance processes based on the aggregate risk score.

24. The computer-implemented method of claim 23, further comprising:
   assigning, by the system, the risk assessment metrics based on vulnerability data of the group of compliance processes.

25. The computer-implemented method of claim 24, wherein the training is based on at least one of historical vulnerability data, expert feedback, operational data feedback, or transfer learning data.

* * * * *